(12) United States Patent
Stevenson et al.

(10) Patent No.: US 12,541,874 B2
(45) Date of Patent: Feb. 3, 2026

(54) LEAD ORIENTATION DETERMINATION FOR ELECTRICAL STIMULATION THERAPY

(71) Applicant: Medtronic, Inc., Minneapolis, MN (US)

(72) Inventors: Tyler S. Stevenson, Westminster, CO (US); Stephen Cook, Lafayette, CO (US); Jason Bridenstine, American Fork, UT (US); Ryan Datteri, Denver, CO (US); Shai Ronen, Westminster, CO (US)

(73) Assignee: Medtronic, Inc., Minneapolis, MN (US)

(*) Notice: Subject to any disclaimer, the term of this patent is extended or adjusted under 35 U.S.C. 154(b) by 524 days.

(21) Appl. No.: 17/934,805

(22) Filed: Sep. 23, 2022

(65) Prior Publication Data
US 2023/0120840 A1    Apr. 20, 2023

Related U.S. Application Data

(60) Provisional application No. 63/262,804, filed on Oct. 20, 2021.

(51) Int. Cl.
*G06T 7/73* (2017.01)

(52) U.S. Cl.
CPC ...... *G06T 7/74* (2017.01); *G06T 2207/20092* (2013.01); *G06T 2207/30204* (2013.01)

(58) Field of Classification Search
CPC ............ G06T 7/74; G06T 2207/20092; G06T 2207/30204; A61N 1/0529; A61N 1/37247
USPC ......................................................... 382/128
See application file for complete search history.

(56) References Cited

U.S. PATENT DOCUMENTS

| | | | |
|---|---|---|---|
| 6,542,773 B2 | 4/2003 | Dupree et al. | |
| 8,224,456 B2 * | 7/2012 | Daglow | A61N 1/0551 607/116 |
| 8,995,731 B2 | 3/2015 | Joglekar | |
| 9,549,172 B2 | 1/2017 | Kim et al. | |
| 10,265,531 B2 | 4/2019 | Bokil | |
| 10,525,257 B2 | 1/2020 | Govea et al. | |
| 10,631,937 B2 | 4/2020 | Tyulmankov et al. | |
| 10,661,074 B2 | 5/2020 | Goetz et al. | |
| 10,959,672 B2 | 3/2021 | Souza et al. | |
| 11,090,494 B2 | 8/2021 | Stone et al. | |
| 11,872,086 B2 * | 1/2024 | Karmarkar | A61B 5/6847 |
| 2009/0281417 A1 | 11/2009 | Hartmann et al. | |
| 2010/0030063 A1 | 2/2010 | Lee et al. | |
| 2010/0284593 A1 | 11/2010 | Delsanto et al. | |

(Continued)

OTHER PUBLICATIONS

Lee et al., "IMproving MR Image Quality in Patients with Metallic Implants", RadioGraphics, vol. 41, No. 4, PubMed, Jul. 2021, pp. E126-E137, doi: 10.1148/rg.2021200092.

(Continued)

*Primary Examiner* — Charlotte M Baker
(74) *Attorney, Agent, or Firm* — Shumaker & Sieffert, P.A.

(57) ABSTRACT

A system includes memory configured to store image content representative of a lead implanted within a patient, and processing circuitry. The processing circuitry is configured to determine a reference point in the image content, determine a plane in the image content that corresponds to an orientation marker based on the reference point, determine an orientation of the lead based on the determined plane, and output information indicative of the determined orientation.

17 Claims, 10 Drawing Sheets

(56) References Cited

U.S. PATENT DOCUMENTS

| | | | |
|---|---|---|---|
| 2017/0136238 A1 | 5/2017 | Hartig et al. |
| 2018/0008820 A1 | 1/2018 | Goetz et al. |
| 2018/0307310 A1 | 10/2018 | Mccombe et al. |
| 2019/0192229 A1 | 6/2019 | Berlin et al. |
| 2020/0230397 A1 | 7/2020 | Li et al. |
| 2020/0237326 A1 | 7/2020 | Achatz et al. |
| 2020/0337636 A1 | 10/2020 | Souza et al. |
| 2022/0061784 A1 | 3/2022 | Baxter, III et al. |
| 2022/0184401 A1 | 6/2022 | Vaidyanathan |
| 2022/0202491 A1 | 6/2022 | Pathak et al. |
| 2023/0120840 A1 | 4/2023 | Stevenson et al. |

OTHER PUBLICATIONS

Bokil et al., "EP 53: Determining the Orientation of Directional Deep Brain Stimulation Leads From Computed Tomography Data," Clinical Neurophysiology, vol. 127, Issue 9, Sep. 2016, p. e198.

Hellerbach et al., "DiODe: Directional Orientation Detection of Segmented Deep Brain Stimulation Leads: A Sequential Algorithm Based on CT Imaging," Stereotactic and Functional Neurosurgery, vol. 96, Nov. 27, 2018, pp. 335-341.

Hunsche et al., "Determining the Rotational Orientation of Directional Deep Brain Stimulation Leads Employing Flat-Panel Computed Tomography," Operative Neurosurgery, vol. 16, No. 4, Apr. 2019, pp. 465-470.

Motevakel et al., "Localization of Deep Brain Stimulation Electrodes via Metal Artifacts in CT Images," 2014 36th Annual International Conference of the IEEE Engineering in Medicine and Biology Society, vol. 127, Aug. 26-30, 2014, pp. 1055-1058.

Reinacher et al., "Determining the Orientation of Directional Deep Brain Stimulation Electrodes Using 3D Rotational Fluoroscopy," American Journal of Neuroradiology, vol. 38, Issue 6, May 2017, pp. 1111-1116.

Sitz et al., "Determining The Orientation Angle of Directional Leads For Deep Brain Stimulation Using Computed Tomography and Digital X-Ray Imaging: A Phantom Study," Medical Physics, vol. 44, No. 9, Sep. 2017, pp. 4463-4473.

Response to Extended Search Report dated Mar. 17, 2023, from counterpart European Application No. 22201799.8 filed Oct. 20, 2023, 7 pp.

Extended Search Report from counterpart European Application No. 22201799.8 dated Mar. 17, 2023, 6 pp.

Communication pursuant to Article 94(3) EPC from counterpart European Application No. 22201799.8 dated Sep. 29, 2025, 4 pp.

* cited by examiner

LEAD ORIENTATION DETERMINATION FOR ELECTRICAL STIMULATION THERAPY

This application claims the benefit of U.S. Provisional Patent Application No. 63/262,804, filed on Oct. 20, 2021, the entire content of which is incorporated herein by reference.

TECHNICAL FIELD

This disclosure generally relates to medical devices, and more specifically, determining orientation of medical leads.

BACKGROUND

Implantable medical devices, such as electrical stimulators or therapeutic agent delivery devices, have been proposed for use in different therapeutic applications, such as deep brain stimulation (DBS), spinal cord stimulation (SCS), pelvic stimulation, gastric stimulation, peripheral nerve stimulation, functional electrical stimulation or delivery of pharmaceutical agents, insulin, pain relieving agents or anti-inflammatory agents to a target tissue site within a patient. In some systems, an implantable electrical stimulator delivers electrical therapy to a target tissue site within a patient with the aid of one or more electrodes, which may be deployed by medical leads and/or on a housing of the electrical stimulator, or both.

During a programming session, which may occur during implant of the medical device, during a trial session, or during an in-clinic or remote follow-up session after the medical device is implanted in the patient, a clinician may generate one or more therapy programs (also referred to as therapy parameter sets) that are found to provide efficacious therapy to the patient, where each therapy program may define values for a set of therapy parameters. A medical device may deliver therapy to a patient according to one or more stored therapy programs. In the case of electrical stimulation, the therapy parameters may define characteristics of the electrical stimulation waveform to be delivered. In examples in which electrical stimulation is delivered in the form of electrical pulses, for example, the therapy parameters may include an electrode configuration including an electrode combination and electrode polarities, an amplitude, which may be a current or voltage amplitude, a pulse width, and a pulse rate.

SUMMARY

In general, the disclosure is directed to devices, systems, and techniques for determining lead orientation of patient implanted leads that can be used for electrical stimulation therapy, such as directional electrical stimulation therapy. For purposes of illustration, the example techniques are described with respect to deep brain stimulation (DBS), but the example techniques are not so limited. An implantable medical device (IMD) may be coupled to one or more leads carrying one or more respective electrodes. These electrodes may be disposed at different locations around the perimeter of the lead which enables directional stimulation and/or sensing via the lead. Once implanted, a lead detection system may determine the circumferential orientation of the lead, and thus the position of the electrodes carried on the lead, with respect to the anatomy of the patient, such as with respect to the location, position, or anatomy of patient tissue that is relevant to electrical stimulation therapy.

For example, leads used for electrical stimulation include electrodes, such as ring electrodes, segmented electrodes, and the like that deliver electrical stimulation therapy, and can possibly be used as a return path for the electrical stimulation therapy. As an example, segmented electrodes, as well other types of electrodes, assist with electrical stimulation therapy steering. For instance, by selecting the appropriate set of electrodes, the area stimulated by electrical stimulation therapy can be targeted to ensure that power is efficiently utilized to deliver electrical stimulation therapy to the intended target for efficacious therapy with minimal current or voltage.

This disclosure describes determining the implanted lead's orientation based on hyperintensive regions present in patient images from orientation markers present on the leads. The hyperintensive regions may be regions having relatively high luminance or brightness (e.g., relatively high intensity), such as region of voxels having luminance or brightness that is suprathreshold to a brightness or luminance threshold. The hyperintensive regions may be the orientation markers themselves, may be artifacts caused by the orientation markers, or a combination of the two (e.g., orientation markers themselves and artifacts caused by the orientation markers).

For instance, as described in more detail, based on lead geometry (e.g., distance between electrodes, distance between electrodes and the orientation markers, etc.), processing circuitry may be configured to determine a plane in the patient images captured during or post implantation surgery. The term lead geometry may also be referred to as lead parameters.

Based on the determined plane, the processing circuitry or possibly a user, may determine hyperintensive regions present in the determined plane that align with the orientation markers, as a way to determine how the orientation markers are oriented. Based on a determination of how the orientation markers are oriented, the processing circuitry or the user may determine orientation of the lead. For example, the processing circuitry or possibly a user, may use the presence of hyperintensive regions in the determined plane and the alignment of the hyperintensive regions with the lead's orientation marker geometry as a way to determine the orientation of the lead.

Accordingly, in one or more example techniques described in this disclosure, processing circuitry may be configured to perform image processing to determine lead orientation more accurately. For instance, with accurate determination of lead orientation, it may be possible to more accurately determine the positioning of the electrodes relative to the targeted area (e.g., targeted patient tissue or anatomy) to stimulate for electrode selection, as well as determining therapy parameters such as amplitude, pulse width, and frequency of the electrical stimulation therapy.

In one example, the disclosure describes a system comprising: memory configured to store image content representative of a lead implanted within a patient; and processing circuitry configured to: determine a reference point in the image content; determine a plane in the image content that corresponds to an orientation marker based on the reference point; determine an orientation of the lead based on the determined plane; and output information indicative of the determined orientation.

In one example, the disclosure describes a system comprising: memory configured to store image content representative of a lead implanted within a patient; and processing circuitry configured to: determine a reference point in the image content; determine a plane in the image content that corresponds to an orientation marker based on the reference point; determine an initial orientation of the lead based on the determined plane; display the lead having the determined initial orientation; receive user input to adjust the initial orientation; and generate information indicative of an orientation of the lead based on the user input to adjust the initial orientation.

In one example, the disclosure describes a method comprising: determining a reference point in image content representative of a lead implanted within a patient; determining a plane in the image content that corresponds to an orientation marker based on the reference point; determining an orientation of the lead based on the determined plane; and outputting information indicative of the determined orientation.

In one example, the disclosure describes a method comprising: determining a reference point in image content representative of a lead implanted within a patient; determining a plane in the image content that corresponds to an orientation marker based on the reference point; determining an initial orientation of the lead based on the determined plane; displaying the lead having the determined initial orientation; receiving user input to adjust the initial orientation; and generating information indicative of an orientation of the lead based on the user input to adjust the initial orientation.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
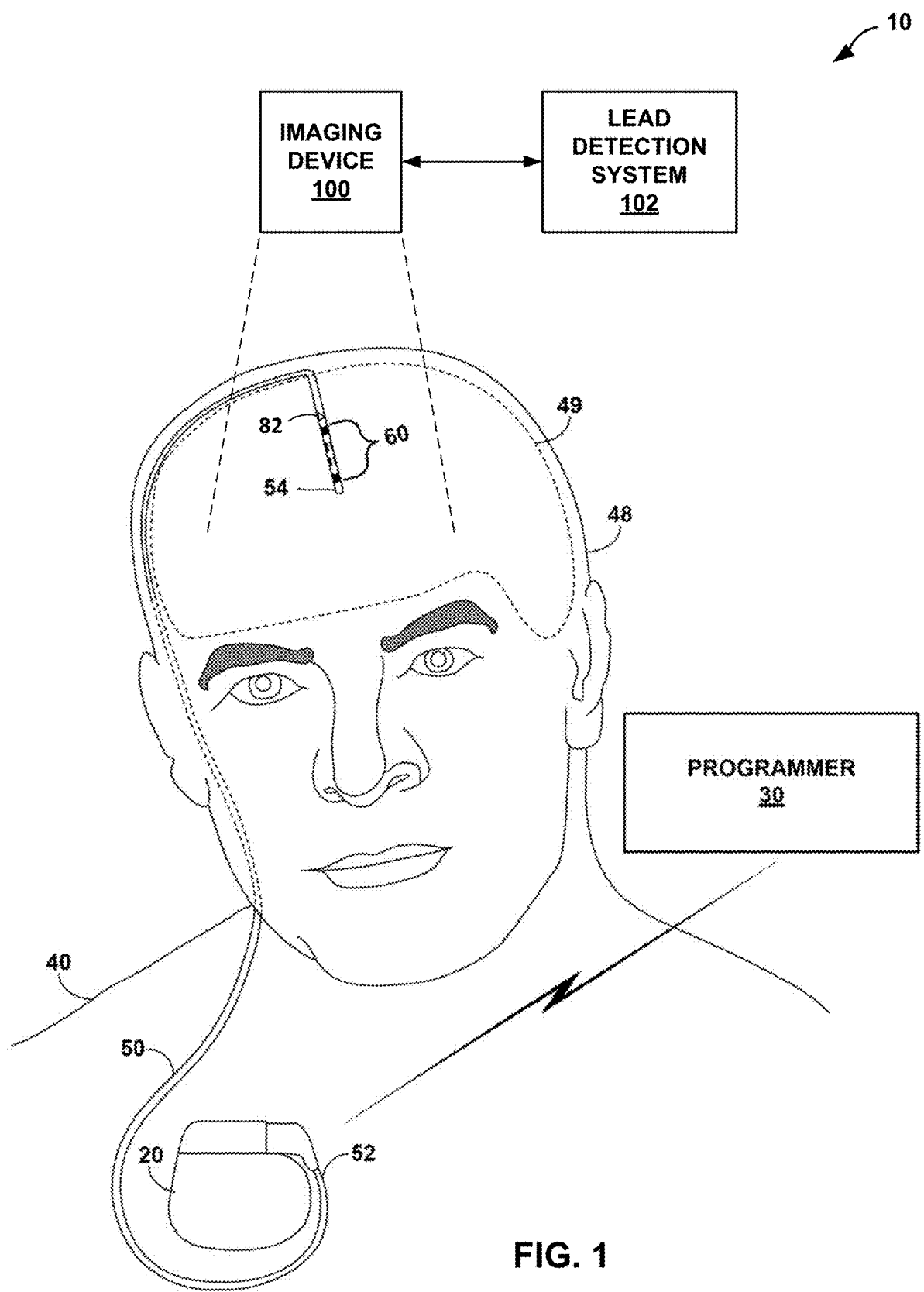
FIG. 1 is a conceptual diagram illustrating an example deep brain stimulation (DBS) system configured to detect a lead configured to deliver electrical stimulation therapy to a tissue site within a brain of a patient.

An implantable medical device (IMD) may be configured to deliver electrical stimulation therapy through a lead. For instance, a lead includes one or more electrodes that are used to deliver electrical stimulation therapy to the patient. Some electrodes, such as ring electrodes disposed completed around a perimeter of a lead housing, may deliver electrical stimulation therapy radially in all directions about a longitudinal axis of the lead. Other electrodes, such as partial ring or segmented electrodes, are located at a specific portion of the perimeter of the lead. In this manner, these electrodes located at a specific perimeter or circumferential position may be referred to as directional electrodes in that they enable the delivery of electrical stimulation therapy radially in only certain directions about the longitudinal axis of the lead that correspond with the position of the partial ring or segmented electrode.

Knowing the actual orientation of the lead (i.e., to enable the targeting of specific patient tissue/anatomy) may be important to effective programming a stimulator to deliver therapy using leads with electrodes having complex geometry (e.g., electrodes at different locations around a perimeter of the lead). However, a clinician may not be able to implant a lead while maintaining a specific rotational orientation and/or the leads may rotate about the longitudinal axis after initial insertion (e.g., upon securing the lead and/or over time being implanted within the patient). In this manner, the physician may need to program the lead without knowing the orientation of the lead (e.g., rotational orientation and/or longitudinal orientation) with respect to anatomical tissue of the patient.

The disclosure describes examples of medical devices, systems, and techniques for determining lead orientation of patient implanted leads that can be used for electrical stimulation therapy, such as directional electrical stimulation therapy. The lead position may refer to the location of where the lead is implanted, so that the lead features (e.g., electrode rings, segmented electrodes, orientation markers) can be longitudinally located (along the lead's axis) within the image content. The lead orientation may refer to the rotation from initially determined orientation (e.g., by processing circuitry) to the final orientation where lead features (e.g., segmented electrodes, orientation markers) match the location of their respective image artifacts (e.g., hyperintensive areas) within the image content.

In one or more examples, the lead itself is not being rotated. Rather, a model of the lead is rotated to align the model with the image content. This way, the lead features of the model align with the image artifacts (e.g., hyperintensive areas), and the orientation of the model where the lead features align with the image artifacts (e.g., hyperintensive areas) is indicative of the lead orientation.

Accordingly, the lead position may provide information of a location of where the lead is implanted (e.g., depth, angle, etc.). The lead orientation may provide information of the rotation of the lead along an axial midline (e.g., a circumferential orientation about a longitudinal axis through a lead).

Determining the lead orientation may be useful in various examples. For instance, as noted above, the IMD delivers electrical stimulation therapy from electrodes of the lead. The areas (e.g., patient tissue or anatomy) targeted by the electrical stimulation therapy may be based on which electrodes are selected and the orientation of the lead. Accordingly, by determining the lead orientation, a clinician or surgeon may be able to select the appropriate electrodes to deliver the electrical stimulation therapy so as to target the desired area with the electrical stimulation therapy.

This disclosure describes example techniques to leverage image hyperintensive regions of orientation markers that are generated in image content of a lead to determine the orientation of the lead. As described above, the hyperintensive regions may be regions having relatively high luminance or brightness (e.g., relatively high intensity), such as region of voxels having luminance or brightness that is suprathreshold to a brightness or luminance threshold. The hyperintensive regions may be the orientation markers themselves, may be artifacts caused by the orientation markers, or a combination of the two (e.g., orientation markers themselves and artifacts caused by the orientation markers).

For example, a lead may include one or more orientation markers that are made of metal. In some imaging modalities, such as computed tomography (CT) or O-ARM™, generate three-dimensional (3D) image content in which voxels corresponding to metal have a relatively high amount of luminance. That is, metal appears as bright objects in the 3D image content.

As described in more detail, in one or more examples, processing circuitry may be configured to determine a position of the lead based on the image content. The processing circuitry may be processing circuitry of the imaging modality, processing circuitry of a desktop, laptop, or tablet, processing circuitry located in a remote server (e.g., in a cloud), processing circuitry of a programmer for the IMD, and the like.

As one example, to determine the position of the lead, a user may select a point in the image content (e.g., such as a point that is located on the lead's axis and corresponds to the most distal electrode), and select a direction of the lead (e.g., a direction vector that extends from the point in the proximal direction). The processing circuitry may determine the position of the lead based on the selected point and selected direction vector, and display a representation of the lead in the determined position. The user may then further manipulate the representation of the lead to align the representation of the lead to the image content.

In some examples, rather than the user performing such operations, the processing circuitry may be configured to perform such operations based on determining locations of electrodes in the image content. For instance, the electrodes may appear as bright objects in the image content due to being made from metal. For the bright objects, the processing circuitry may determine whether the bright objects correspond to electrodes. As an example, if the bright objects are shaped how electrodes appear in images from the imagining modality and spaced at distances that corresponds to the distances between the electrodes, then the processing circuitry may determine that the bright objects correspond to electrodes. The processing circuitry may determine the position of the lead based on the determination of the electrodes. There may be various other ways in which the processing circuitry may determine the position of the lead.

The processing circuitry may determine a reference point and direction vector in the image content. For instance, the reference point may be a point in the image content that corresponds to an electrode (e.g., an electrode near a distal tip of the lead. The direction vector may correspond to the position of the point on the axis of the lead body axis that is located relative to a known lead feature (e.g., most distal electrode ring) and the distal-proximal direction along the lead body's axis, both defined with respect to the coordinate system of the image. In some examples, to determine the reference point and direction vector, the processing circuitry may receive user input of the reference point and direction vector. In some examples, the processing circuitry may determine the reference point and direction vector based on luminance of the image content.

As described above, the lead may include one or more orientation markers. The distances between orientation markers and electrodes may be set and different for different lead types. That is, for all leads of lead type "X," the positions of the orientation markers and electrodes may be same, and therefore, the distances between the orientation markers and the electrodes for leads of lead type "X" may be known and stored in memory.

Based on the reference point (e.g., a point in the image content that corresponds to the electrode(s) (e.g., most distal electrode) and the known distance between the electrode and the orientation markers, the processing circuitry may determine one or more planes in the image content that correspond to the one or more orientation markers. In some examples, based on the reference point (e.g., a point in the image content located on the lead axis that corresponds to the most distal electrode), direction vector, and the known longitudinal distance between the electrode and the orientation markers, the processing circuitry may determine one or more planes in the image content that correspond to the one or more orientation markers. For instance, the processing circuitry may retrieve information indicative of a distance between the reference point and an orientation marker (e.g., based on the direction vector), and determine an axial location of the orientation marker based on the distance between the reference point and the lead. The processing circuitry may determine the plane in the image content based on the determined axial location of the orientation marker.

The axial location of the orientation marker may refer to the location along an axis that passes axially through the midline of the lead. The plane in the image content that corresponds to the orientation marker may refer to two-dimensional (2D) cutout along the plane in the image content at which the orientation markers are located.

The processing circuitry may determine an orientation of the lead based on the determined plane, and output information indicative of the determined orientation. For example, as described above, the orientation markers generate hyperintensive regions in the image content (e.g., area of relatively high luminance caused by the orientation markers or artifacts of the orientation markers). In some examples, the orientation markers are located on one portion of the lead. As an example, assuming a cylindrical lead, an orientation marker may encompass approximately an area of 30° of the surface of the lead at a particular axial distance. Accordingly, a hyperintensive region (e.g., area or region having hyperintensive voxels) in the image content, in the plane in which an orientation marker is located, may be present in greater concentration along where the orientation marker is located. Therefore, there being a greater concentration of high intensity voxels in a hyperintensive region in the image content may correspond to where the orientation marker is oriented. Based on determining where the orientation marker is oriented, the processing circuitry may determine the orientation of the lead, and output information indicative the determined orientation.

In this way, by identifying a reference point (e.g., location of electrode), it may be possible for the processing circuitry to determine the plane in which the orientation marker is located. In some examples, based on the reference point (e.g., a point in the image content located on the lead axis that corresponds to the most distal electrode), direction vector, and the known longitudinal distance between the electrode and the orientation markers, the processing circuitry may determine the plane in which the orientation marker is located.

After determining the plane in which orientation marker is located, the processing circuitry may to determine the orientation of the orientation marker, from which the orientation of the lead can be determined. For instance, because the orientation marker is formed, or otherwise, connected to the surface of the lead at a particular location, once the orientation marker orientation is known, there can only be one orientation of the lead that results in the orientation marker being oriented as determined.

The above example techniques describe processing circuitry automating operations, or performing operations based on user input. For instance, to determine the orientation of the lead with user input, the processing circuitry may be configured to output a display of the determined plane in the image content, and receive user input indicative of the orientation of the lead in response to outputting the display of the determined plane. For example, the user may rotate a representation of the lead about a longitudinal axis of the representation of the lead in the display to align the orientation marker to the hyperintensive region to determine the orientation marker orientation.

As another example, to determine the orientation of the lead in an automated way, the processing circuitry may be configured to determine an area in the plane having relatively high luminance, determine that the area in the plane corresponds to an orientation of the orientation marker, and determine the orientation of the lead based on the orientation of the orientation marker. One way to determine the area in the plane having relatively high luminance is by determining centroids along the 2D planes along the image content of the lead at the orientation marker, and projecting direction vectors orthogonal to the centroid in each direction to identify the vector(s) having the brightest voxels. The direction vector(s) that include the most voxels having a relatively high luminance may define the area in the plane having relatively high luminance.

In some examples, the processing circuitry may perform both the automated technique and the user input technique to determine the orientation of the lead. For instance, the processing circuitry may perform the automated technique to determine an initial orientation of the lead. The user may then provide user input to determine the orientation (e.g., final orientation) of the lead. For example, the processing circuitry may be configured to determine a reference point in the image content, determine a plane in the image content that corresponds to an orientation marker based on the reference point, and possibly based on the direction vector and the known longitudinal distance between the electrode and orientation markers, determine an initial orientation of the lead based on the determined plane, display the lead having the determined initial orientation, receive user input to adjust the initial orientation, and generate information indicative of an orientation of the lead based on the user input to adjust the initial orientation.

To determine the plane in the image content based on the reference point, the processing circuitry may utilize the reference point and a direction vector that indicates the direction of the lead in the image content. For instance, because the image content is in three-dimensional space, a particular distance from the reference point may be in any direction in the 3D space. By utilizing a direction vector that indicates the direction of the lead in the image content, the processing circuitry may be able to identify the location of the orientation marker.

The various systems, devices, and techniques described herein may provide one or more advantages of other approaches. For example, the system as described herein may determine the rotational, or circumferential, orientation of the lead with respect to patient tissue. This lead orientation can then be leveraged by the system and the clinician to appropriately program one or more sensing vectors or stimulation therapy with electrodes at known locations with respect to one or more anatomical structures of the patient. This process may result in more efficacious therapy and lower risks of side effects.

FIG. 1 is a conceptual diagram illustrating an exemplary system 10 including lead 50 implanted in the brain 49 of patient 40. Although only one lead 50 is shown for illustration, two or more leads may be implanted in brain 49, and system 10 may determine the orientation of each lead implanted in patient 40. For ease of illustration, examples of the disclosure will primarily be described with regard to implantable electrical stimulation leads and implantable medical devices that apply neurostimulation therapy to brain 49 of patient 40 in the form of deep brain stimulation (DBS). However, the features and techniques described herein may be useful in other types of medical device systems which employ medical leads to deliver electrical stimulation to a patient and/or sense electrical signals via one or more electrodes of the lead. For example, the features and techniques described herein may be used in systems with medical devices that deliver stimulation therapy to a patient's heart, e.g., pacemakers, and pacemaker-cardioverter-defibrillators. As other examples, the features and techniques described herein may be embodied in systems that deliver other types of neurostimulation therapy (e.g., spinal cord stimulation or vagal stimulation), stimulation of at least one muscle or muscle groups, stimulation of at least one organ such as gastric system stimulation, stimulation concomitant to gene therapy, and, in general, stimulation of any tissue of a patient. The medical lead system may be used with human subjects or with non-human subjects.

As shown in FIG. 1, system 10 includes medical device programmer 30, implantable medical device (IMD) 20, and lead 50. Lead 50 includes plurality of electrodes 60, and plurality of orientation markers 82 adjacent a distal end 54 of lead 50. IMD 20 includes stimulation therapy circuitry that includes an electrical stimulation generator that generates and delivers electrical stimulation therapy to one or more regions of brain 49 of patient 40 via one or more of electrodes 60. In the example shown in FIG. 1, system 10 may be referred to as a DBS system because IMD 20 provides electrical stimulation therapy directly to tissue within brain 49, e.g., a tissue site under the dura mater of brain 49. In other examples, one or more of lead 50 may be positioned to deliver therapy to a surface of brain 49 (e.g., the cortical surface of brain 49).

Lead 50 includes distal end 54 and a proximal end 52. As lead 50 is assembled, respective electrical connection sleeves (not shown in FIG. 1) adjacent proximal end 52 provide an electrical connection between IMD 20 and the conductive pathways of lead 50 running to electrodes 60 adjacent distal end 54 defined by the plurality of conductors of lead 50. Using the conductive pathways, IMD 20 may deliver electrical stimulation to patient 40 and/or sense electric signals of patient 40 using lead 50. While FIG. 1 illustrates proximal end of lead 50 connected directly to the header of IMD 20, in other examples, the proximal end of lead 50 may be connected to one or more lead extensions which are connected to the header of IMD 20 to electrically connect lead 50 to IMD 20.

In the example shown in FIG. 1, IMD 20 may be implanted within a subcutaneous pocket below the clavicle of patient 40. In other examples, IMB 20 may be implanted within other regions of patient 40, such as a subcutaneous pocket in the abdomen or buttocks of patient 40 or proximate the cranium 48 of patient 40. Proximal end 52 of lead 50 is coupled to IMB 20 via a connection sleeve block (also referred to as a header), which may include, for example, electrical contacts that electrically couple to respective electrical contacts at proximal end 52 of lead 50. The electrical contacts electrically couple the electrodes 60 carried by distal end 54 of lead 50. Lead 50 traverses from the implant site of IMD 20 within a chest cavity of patient 40, along the neck of patient 40 and through the cranium of patient 40 to access brain 49. Generally, IMD 20 is constructed of a biocompatible material that resists corrosion and degradation from bodily fluids. IMD 20 may comprise a hermetic housing to substantially enclose components, such as a processor, therapy module, and memory.

Lead 50 may be positioned to deliver electrical stimulation to one or more target tissue sites within brain 49 to manage patient symptoms associated with a disorder of patient 40. Lead 50 may be implanted to position electrodes 60 at desired locations of brain 49 through respective holes in cranium 48. Lead 50 may be placed at any location within brain 49 such that electrodes 60 are capable of providing electrical stimulation to target tissue sites within brain 49 during treatment. Although FIG. 1 illustrates system 10 as including a single lead 50 coupled to IMD 20, in some examples, system 10 may include more than one lead.

Lead 50 may deliver electrical stimulation via electrodes 60 to treat any number of neurological disorders or diseases in addition to movement disorders, such as seizure disorders or psychiatric disorders. Lead 50 may be implanted within a desired location of brain 49 via any suitable technique, such as through respective burr holes in a skull of patient 40 or through a common burr hole in the cranium 48. Lead 50 may be placed at any location within brain 49 such that electrodes 60 of lead 50 are capable of providing electrical stimulation to targeted tissue during treatment. In the examples shown in FIG. 1, electrodes 60 of lead 50 are shown as segmented electrodes and ring electrodes. Electrodes 60 of lead 50 may have a complex electrode array geometry that is capable of producing shaped electrical fields. In this manner, electrical stimulation may be directed to a specific direction from lead 50 to enhance therapy efficacy and reduce possible adverse side effects from stimulating a large volume of tissue.

IMD 20 may deliver electrical stimulation therapy to brain 49 of patient 40 according to one or more stimulation therapy programs. A therapy program may define one or more electrical stimulation parameter values for therapy generated and delivered from IMD 20 to brain 49 of patient 40. Where IMD 20 delivers electrical stimulation in the form of electrical pulses, for example, the stimulation therapy may be characterized by selected pulse parameters, such as pulse amplitude, pulse rate, and pulse width. In addition, if different electrodes are available for delivery of stimulation, the therapy may be further characterized by different electrode combinations, which can include selected electrodes and their respective polarities. The exact therapy parameter values of the stimulation therapy that helps manage or treat a patient disorder may be specific for the particular target stimulation site (e.g., the region of the brain) involved as well as the particular patient and patient condition.

In addition to delivering therapy to manage a disorder of patient 40, system 10 monitors electrical signals, such as, e.g., one or more bioelectrical brain signals of patient 40. For example, IMD 20 may include a sensing module that senses bioelectrical brain signals within one or more regions of brain 49. In the example shown in FIG. 1, the signals generated by electrodes 60 are conducted to the sensing module within IMD 20 via conductors within lead 50, including one or more conductors within lead 50 between distal end 54 and proximal end 52 of lead 50.

Programmer 30 wirelessly communicates with IMD 20 as needed to provide or retrieve therapy information. Programmer 30 is an external computing device that the user, e.g., the clinician and/or patient 40, may use to communicate with IMD 20. For example, programmer 30 may be a clinician programmer that the clinician uses to communicate with IMD 20 and program one or more therapy programs for IMD 20. Alternatively, programmer 30 may be a patient programmer that allows patient 40 to select programs and/or view and modify therapy parameters. The clinician programmer may include more programming features than the patient programmer. In other words, more complex or sensitive tasks may only be allowed by the clinician programmer to prevent an untrained patient from making undesired changes to IMD 20.

Programmer 30 may be a hand-held computing device with a display viewable by the user and an interface for providing input to programmer 30 (i.e., a user input mechanism). In other examples, programmer 30 may be a larger workstation or a separate application within another multi-function device, rather than a dedicated computing device. For example, the multi-function device may be a notebook computer, tablet computer, workstation, cellular phone, personal digital assistant, or another computing device that may run an application that enables the computing device to operate as a secure medical device programmer 30.

Again, while lead 50 is described here for use in DBS applications, lead 50 or other leads may be implanted at any other location within patient 40. For example, lead 50 may be implanted near the spinal cord, pudendal nerve, sacral nerve, cardiac tissue, or any other nerve or muscle tissue that may be the subject of stimulation or from which electrical signals are sensed via the electrodes. The user interface described herein may be used to program the stimulation parameters of any type of stimulation therapy. In the case of pelvic nerves, defining a stimulation field may allow the clinician to stimulate multiple desired nerves without placing multiple leads deep into patient 40 and adjacent to sensitive nerve tissue. Therapy may also be changed if leads migrate to new locations within the tissue or patient 40 no longer perceives therapeutic effects of the stimulation. The features or techniques of this disclosure may be useful in other types of medical applications.

As described herein, lead detection system 102 may receive imaging data from imaging device 100. In some examples, imaging device 100 may be a CT machine that generates CT imaging data that is received by lead detection system 102. Lead detection system may be any type of computing device that can analyze CT imaging data as described herein. In some examples, programmer 30, IMD 20, a remote server, or any other computing device may be configured to provide the functionality attributed to lead detection system 102 such as determining the orientation of lead 50 within patient 40. Lead detection system 102 may include processing circuitry configured to receive computed tomography (CT) image data representing lead 50 implanted within patient 40. The processing circuitry may be configured to determine an orientation of lead 50, and output information indicative of the determined orientation.

To determine the orientation of lead 50, the processing circuitry may be configured to receive the image content of lead 50 implanted within patient 40 form imaging device 100. The image content may be CT image data stored in memory of lead detection system 102.

In one or more examples, the processing circuitry may be configured to determine hyperintensive region(s) in the image content that correspond to orientation markers 82 for determining an orientation of orientation markers 82, which is indicative of the orientation of lead 50. For example, orientation markers 82 may cause hyperintensive region in the image content (e.g., from orientation markers 82 and/or from artifacts causes by orientation markers 82 in the image content). However, because orientation markers 82 are located only partially around a circumference of lead 50, the hyperintensive region(s) tend to be grouped near where orientation markers 82 appear in the image content, rather than surrounding the entire circumference of lead 50.

However, the processing circuitry may need to determine whether hyperintensive region(s) in the image content are truly from orientation markers 82 or some other source. If the processing circuitry identifies hyperintensive region(s) in the image content that are not due to orientation markers 82, then the processing circuitry may incorrectly determine the orientation of lead 50.

In one or more examples, to determine that a particular group of hyperintensive region(s) are due to orientation markers 82, the processing circuitry may determine plane(s) (e.g., axial plane(s) that cuts across lead 50 widthwise) that corresponds to orientation markers 82. As one example, the processing circuitry may determine a reference point in the image content. As one example, the reference point may be a point that represents to a center of an electrode of lead 50.

Since the distance of orientation markers 82 relative to the center of an electrode of lead 50 is fixed, processing circuitry may access from memory information indicative of the distance of orientation markers 82 relative to the center of the electrode of lead 50 to determine the axial location of orientation markers 82. The plane(s) in the image content that correspond to orientation markers 82 may be the axial plane(s) at the determined axial location of orientation markers 82.

In one or more examples, the processing circuitry may determine the orientation of lead 50 based on the determined plane(s). For instance, the processing circuitry may determine where the voxels of hyperintensive region(s) are grouped together in larger concentration than elsewhere, and determine the orientation of orientation markers 82 based on where the voxels of hyperintensive region(s) are grouped together in larger concentration.

There may be various ways in which to identify hyperintensive region(s) in the image content. As one example, the hyperintensive region(s) tend to have relatively high luminance (e.g., brightness) relative to other image content. Accordingly, it may be possible for the processing circuitry to identify the hyperintensive region(s) based on intensity (e.g., luminance, brightness, etc.) of voxels being greater than a threshold.

The above example techniques may be performed by the processing circuitry in a mostly, including fully, autonomous way with little to no user input. In some examples, the above example techniques may be performed by the processing circuitry with some user input.

For instance, to determine the reference point in the image content with user input, the processing circuitry may be configured to receive information indicative of the reference point (e.g., from a user). As another example, to determine the reference point in the image content in a more autonomous manner, the processing circuitry may determine an area in the image content having relatively high luminance, determine that the area corresponds to an electrode on lead 50, and determine the reference point within the area that corresponds to the electrode.

As additional examples, to determine the orientation of lead 50 with some user input, the processing circuitry may output a display of the determined plane in the image content (e.g., the determined axial plane(s) that corresponds to orientation markers 82). The processing circuitry may receive user input indicative of the orientation of lead 50 in response to outputting the display of the determined plane.

For example, the processing circuitry may output a graphical representation of lead 50 having graphical representations of orientation markers 82. The user may graphically twist the graphical representation of lead 50 to align the graphical representation of orientation markers 82 to the areas (e.g., hyperintensive regions) in the plane having the relatively high concentration of hyperintensive voxels. The result may be the orientation of lead 50. Since the processing circuitry responds to the twist of the graphical representation of lead 50 by the user, the processing circuitry may be considered as being configured to determine an orientation of lead 50.

As an example, to determine the orientation of lead 50 in a more autonomous manner, the processing circuitry may determine an area (e.g., hyperintensive region) in the plane having relatively high luminance. In some examples, the processing circuitry may determine that the area (e.g., hyperintensive region) in the plane corresponds to an orientation of the orientation marker, and determine the orientation of the lead based on the orientation of the orientation marker.

For instance, for automation, the processing circuitry may perform a transformation and resampling of the image content so as to determine a rigid transform such that the lead is oriented along the z axis, using the input tip (e.g., location of the reference point, which may be an electrode) and trajectory (e.g., a direction vector line that extends from the reference point along where the image content of lead 50 is present). The processing circuitry may select electrode thresholds. For instance, the processing circuitry may adaptively select the lead threshold, such that the brightest (e.g., most luminance) voxels with a certain fixed volume, V_lead, will be selected as potential electrodes (e.g., V_lead=10.0 mm^3). In some examples, all the intensities of the image are sorted, and the threshold is selected as the N'th highest one, such that N=V_lead/One_Voxel_volume, where One_Voxel_Volume is the volume of a single voxel. The processing circuitry may scan the image content of lead 50 along the z axis, and compute a centroid of each 2D slice. The processing circuitry may utilize robust linear regression to fit a line which refines the initial trajectory input.

The processing circuitry may be configured to search for orientation markers 82. For example, the processing circuitry may scan the image content of lead 50 along the z axis, and centroid of each 2D slice is computed. By using a CAD model, the centroids for orientation markers 82 should be in a position with a certain distance Dz along the z axis. The processing circuitry may find the best fit that maximizes norm(distance(centroid(z)-centroid(z+Dz))). Dz depends on the lead model of lead 50.

The processing circuitry may determine direction vectors connecting the centroids of orientation markers 82, and project the direction vectors orthogonal to the lead trajectory. The direction vectors that encompass the relatively bright voxels may define the area (e.g., hyperintensive region) in the image content that includes hyperintensive voxel(s) caused by orientation markers 82, and may define the orientation of orientation markers 82. In some examples, the processing circuitry may add a bias (e.g., of 30 degrees), but such adding of bias is not needed in all examples. The processing circuitry may then output the orientation of lead 50.

Lead detection system 102 may include a display configured to output the determined orientation of lead 50 for presentation to a user. The display may present a representation of lead 50 and/or electrodes 60 with respect to an anatomical direction or anatomical structure of patient 40. In some examples, lead detection system 102 may control the display to present other information associated with lead implantation and/or orientation.

Figure 2:
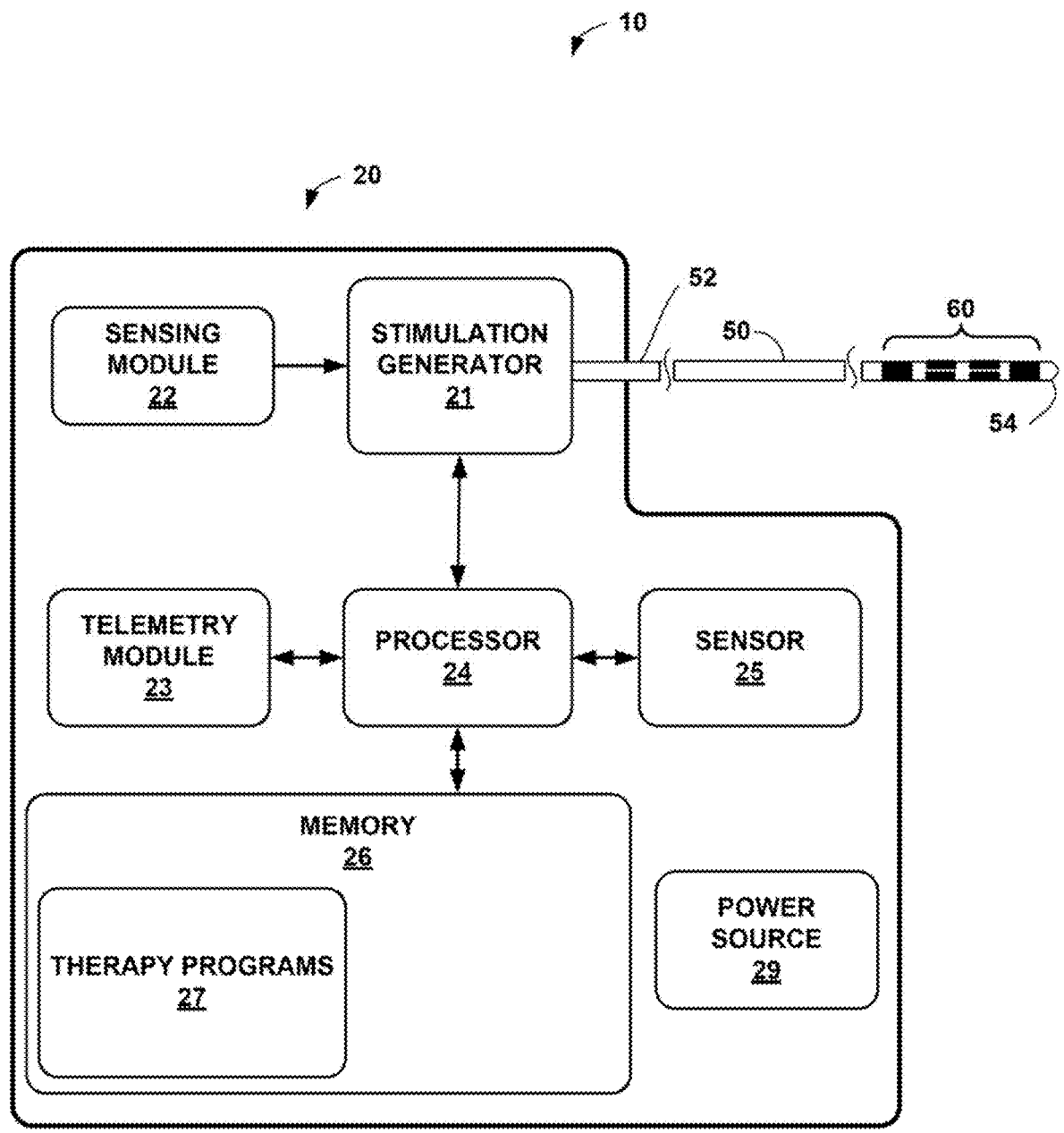
FIG. 2 is functional block diagram illustrating components of an example medical device.

FIG. 2 is a functional block diagram illustrating components of IMD 20. As shown, system 10 includes IMD 20 coupled to lead 50. In the example of FIG. 2, IMD 20 includes processor circuitry 24 (also referred to as "processor", "processors", or "processing circuitry"), memory 26, stimulation generator 21, sensing module 22, telemetry module 23, sensor 25, and power source 29. Each of these components (also referred to as "modules" may be or include electrical circuitry configured to perform the functions attributed to each respective module). For example, processor 24 may include processing circuitry, stimulation generator 21 may include current and/or voltage sources and other circuitry, sensing module 22 may include sensing circuitry, and telemetry module 23 may include telemetry circuitry. Memory 26 may include any volatile or non-volatile media, such as a random-access memory (RAM), read only memory (ROM), non-volatile RAM (NVRAM), electrically erasable programmable ROM (EEPROM), flash memory, and the like. Memory 26 may store computer-readable instructions that, when executed by processor 24, cause IMD 20 to perform various functions. Memory 26 may be a storage device or other non-transitory medium.

Processor 24 may include any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processor 24 herein may be embodied as firmware, hardware, software or any combination thereof. Processor 24 controls stimulation generator 21 to apply particular stimulation parameter values, such as amplitude, pulse width, and pulse rate.

In the example shown in FIG. 2, lead 50 includes electrodes 60 located at distal end 54. Processor 24 also controls stimulation generator 21 to generate and apply the stimulation signals to selected combinations of electrodes of the electrode module. In some examples, stimulation generator 21 comprises a plurality of pairs of voltage sources, current sources, voltage sinks, or current sinks connected to each of electrodes such that each pair of electrodes has a unique signal generator. In other words, in these examples, each of electrodes 60 is independently controlled via its own signal generator (e.g., via a combination of a regulated voltage source and sink or regulated current source and sink), as opposed to switching signals between electrodes 60.

Stimulation generator 21 may be a single channel or multi-channel stimulation generator. In particular, stimulation generator 21 may be capable of delivering a single stimulation pulse or multiple stimulation pulses at a given time via a single electrode combination or multiple stimulation pulses at a given time via multiple electrode combinations. In some examples, however, stimulation generator 21 may be configured to deliver multiple channels on a time-interleaved basis. For example, a switch module of stimulation generator 21 may serve to time divide the output of stimulation generator 21 across different electrode combinations at different times to deliver multiple programs or channels of stimulation energy to patient 40. In another example, the stimulation generator 21 may control the independent sources or sinks on a time-interleaved bases.

Lead 50 may include distal end 54 including a complex electrode array geometry (e.g., with one or more segmented electrodes along the longitudinal axis), but may also include one or more single ring electrodes along the longitudinal axis in other examples. It will be understood that "along the longitudinal axis" as used herein refers to an axial position along the length of the longitudinal axis that may be displaced radially from that axis. In one example, distal end 54 of lead 50 includes a plurality of electrodes 60 positioned at different axial positions along the longitudinal axis of the lead and a plurality of electrodes 60 positioned at different angular positions around the circumference of the lead/around the longitudinal axis (which may be referred to as electrode segments). In this manner, electrodes may be selected along the longitudinal axis of lead 50 and along the circumference of the lead. Selectively activating electrodes 60 of lead 50 can produce customizable stimulation fields that may be directed to a particular side of lead 50 in order to isolate the stimulation field around the target anatomical region of brain 49.

Figure 3:
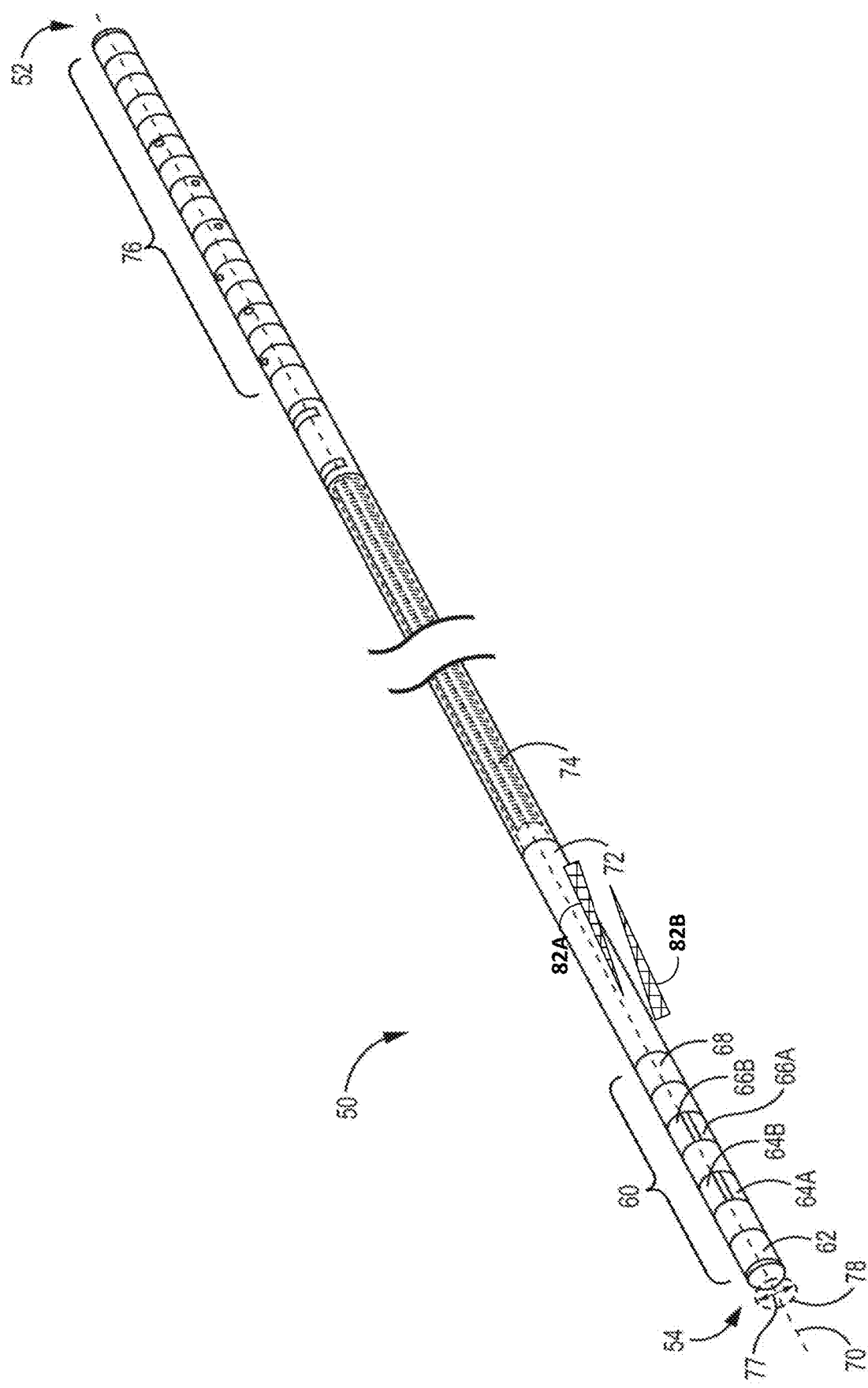
FIG. 3 is a conceptual diagram illustrating components of an example medical lead.

In the example of FIG. 3, lead 50 includes two ring electrodes 68, 62 with two segmented electrode rings 64, 66 each having three segmented electrodes (e.g., segmented electrodes 64A, 64B, 66A, 66B shown in FIG. 3) in between the respective electrodes 68, 62. The techniques described herein may be applied to leads having more or fewer segmented electrodes within a segmented electrode ring and/or to leads having more or fewer than two segmented electrode rings. These techniques may also be applied to leads having more or fewer than two ring electrodes. In yet other cases, lead 50 may include only segmented electrodes or only ring electrodes. In some examples, lead 50 may include a tip electrode which may be in the shape of a rounded cone or other shape that resides at the distal tip of lead 50.

Although sensing module 22 is incorporated into a common housing with stimulation generator 21 and processor 24 in FIG. 2, in other examples, sensing module 22 may be in a separate housing from IMD 20 and may communicate with processor 24 via wired or wireless communication techniques. Example bioelectrical signals include, but are not limited to, a signal generated from local field potentials within one or more regions of the spine or brain, for example. In some examples, sensing module 22 may be configured to couple to electrodes 60 of lead 50 for sensing signals from electrodes 60. Processor 24 may control whether sensing module 22 is to be coupled to electrodes 60 for sensing, or whether stimulation generator 21 is coupled to electrodes 60 for delivering stimulation therapy. In some examples, processor 24 may cause sensing module 22 to couple to a subset of electrodes 60, while stimulation generator 21 is coupled to another subset of electrodes 60.

Sensor 25 may include one or more sensing elements that sense values of a respective patient parameter. For example, sensor 25 may include one or more accelerometers, optical sensors, chemical sensors, temperature sensors, pressure sensors, or any other types of sensors. Sensor 25 may output patient parameter values that may be used as feedback to control delivery of therapy. IMD 20 may include additional sensors within the housing of IMD 20 and/or coupled as a separate module via one of lead 50 or other leads. In addition, IMD 20 may receive sensor signals wirelessly from remote sensors via telemetry module 23, for example. In some examples, one or more of these remote sensors may be external to patient (e.g., carried on the external surface of the skin, attached to clothing, or otherwise positioned external to the patient).

Telemetry module 23 supports wireless communication between IMD 20 and an external programmer (e.g., such as programmer 30) or another computing device under the control of processor 24. Processor 24 of IMD 20 may receive, as updates to programs, values for various stimulation parameters such as amplitude and electrode combination, from programmer 30 via telemetry module 23. The updates to the therapy programs may be stored within therapy programs 27 portion of memory 26. In some examples, IMD 20 may receive lead orientation information directly from lead detection system 102 or via programmer 30. Telemetry module 23 in IMD 20, as well as telemetry modules in other devices and systems described herein, such as programmer 30, may accomplish communication by radiofrequency (RF) communication techniques. In addition, telemetry module 23 may communicate with external medical device programmer 30 via proximal inductive interaction of IMD 20 with programmer 30. Accordingly, telemetry module 23 may send information to programmer 30 on a continuous basis, at periodic intervals, or upon request from IMD 20 or programmer 30.

Power source 29 delivers operating power to various components of IMD 20. Power source 29 may include a small rechargeable or non-rechargeable battery and a power generation circuit to produce the operating power. Recharging may be accomplished through proximal inductive interaction between an external charger and an inductive charging coil within IMD 20. In some examples, power requirements may be small enough to allow IMD 20 to utilize patient motion and implement a kinetic energy-scavenging device to trickle charge a rechargeable battery. In other examples, traditional batteries may be used for a limited period of time.

FIG. 3 is a conceptual diagram illustrating an example medical lead 50. In the example of FIG. 3, there are eight conductors corresponding to eight respective electrodes—2 ring electrodes and 6 segmented electrodes (two different axial locations with three electrodes around the perimeter at each axial location)—and eight electrical terminals, such that the lead 50 defines eight isolated electrical paths or channels for delivery of therapy and/or sensing of electrical signals by IMD 20. However, in other examples, greater or fewer conductors, electrodes, and terminals may be used. Lead 50 includes a distal end 54 and a proximal end 52, corresponding to an electrode end and a terminal end, respectively. Distal end 54 and proximal end 52 may define a longitudinal axis 70 along a length of lead 50. Lead 50 includes an outer perimeter 78 that has a diameter 77. In some examples, diameter 77 of outer perimeter 78 may be between approximately 25 millionth of an inch (mils) (0.635 millimeters (mm) and 100 mils (2.54 mm), although other values are contemplated.

Lead 50 may include a lead body 72 extending between distal end 54 and proximal end 52. Lead body 72 may be configured to provide structure and support to lead 50 and to encase at least a portion of a plurality of conductors 74. At least a portion of lead body 72 may include conductors in a coiled arrangement. In some examples, lead body 72 may act as an insulator between the plurality of conductors 74. In some examples, lead body 72 may extend through the length of lead 50 as a monolithic form. Lead body 72 may be formed from a polymeric material including, but not limited to, polyurethanes, silicones, fluoropolymers, fluoroelastomers, polyethylenes, polyesters, and other biocompatible polymers suitable for contact with bodily tissue.

Lead 50 may include a plurality of terminals 76 near proximal end 52. Each terminal of the plurality of terminals 76 may be configured to electrically couple to a conductor 74 within lead body 72 of lead 50 and a conductor external of lead 50, such as a contact of IMD 20 of FIG. 1. The plurality of terminals 76 may be positioned at or near proximal end 52 of lead 50. In some examples, each terminal in the plurality of terminals 76 may be a ring contact that extends around outer perimeter 78 of lead 50.

Lead 50 may include the plurality of electrical conductors 74 extending about longitudinal axis 70 of lead 50. The plurality of electrical conductors 74 may be electrically isolated from one another by lead body 72 to form separate channels, circuits, or conductive paths through the lead body 72 although techniques described herein also apply to lead body 72 carrying a single conductor. As shown in FIG. 3, the plurality of conductors 74 may be in a coiled arrangement for at least a portion of lead 50 (e.g., between the electrodes 60 and terminal terminals 76). The coiled arrangement of the plurality of conductors 74 may be wound around longitudinal axis 70 of lead 50. In some examples, the plurality of electrical conductors 74 may include an electrical insulator sheath around a conductive portion. The electrical insulator sheath may be configured to electrically insulate a conductor 74 from undesired contact with an electrode or terminal for which electrical contact is not intended for the conductor 74. In some examples, each of the plurality of electrical conductors 74 may have a diameter, with or without the electrical insulator sheath, between at least approximately 0.0025 in. (0.0635 mm) and approximately 0.0080 in. (0.2032 mm).

Each of the plurality of electrical conductors 74 may have a distal connection portion on a distal end and a proximal connection portion on a proximal end of each conductor. The distal and proximal connection portions may be configured to electrically couple each of the plurality of electrical conductors 74 to a respective electrode of the plurality of electrodes 60 and a respective terminal of the plurality of terminals 76. In some examples, the distal and proximal connection portions may include connections sleeves around a perimeter of the respective conductor, where a diameter of each connection sleeve may be larger, smaller, or the same size as a diameter of the remainder conductor body of the respective conductor. In some examples, such as for conductors having an electrical insulator sheath described above, the plurality of conductors 74 may not have distal or proximal connection portions that include connection sleeves. For example, a distal portion of the electrical insulator sheath of a conductor may be removed to expose a bare metal conductor. This bare metal conductor may operate as the distal connection portion to electrically contact an electrode or terminal. Each of the plurality of electrodes 60 may be formed from an electrically conductive material including, but not limited to, platinum, palladium, iridium, titanium and titanium alloys such as titanium molybdenum alloy (TiMoly), nickel and nickel alloys such as MP35N alloy, and the like. For example, electrodes may be formed from an 80/20 platinum/iridium alloy suitable for mechanical crimping.

Lead 50 may include a plurality of electrodes 60 near distal end 54. In the example of FIG. 3, the plurality of electrodes 60 includes ring electrodes 62 and 68, and segmented electrodes, such as segmented electrodes 64A, 64B, 66A, and 66B. While only segmented electrodes 64A, 64B, 66A, and 66B are shown, the segmented electrodes may form a discontinuous conductive ring that includes a plurality of electrodes, such as 64A, 64B, and an anterior electrode 64C (not shown) for an exemplary ring of three segmented electrodes on one ring (collectively referred to as "segmented electrode ring 64"), and 66A, 66B, and an anterior electrode 66C (not shown) on another ring (collectively referred to as "segmented electrode ring 66"). Each segmented electrode of a respective discontinuous segmented electrode ring is electrically isolated from the other segmented electrodes in the respective discontinuous segmented electrode ring. For example, segmented electrodes 64A and 64B, which are part of discontinuous segmented electrode ring 64, are electrically isolated from each other. In this example, there are two sets of three segmented electrodes forming segmented electrode rings 64 and 66 at distal end 54 of lead 50, such that each set of segmented electrodes forming segmented electrode rings 64 and 66 is aligned along a longitudinal axis of the electrode module and the sets are positioned circumferentially around outer perimeter 78 of lead 50. In other examples, one or more segmented electrodes may be positioned along the longitudinal axis without being symmetrically arranged around the longitudinal axis. For instance, a single segment spanning between 90 and 120 degrees may be the only electrode at a particular axial location along the length of the lead such that there is not radial symmetry.

The plurality of electrodes 60 of lead 50 may be constructed of a variety of different designs. For example, one or more leads 50 may include two or more electrodes at each longitudinal location along the length of the lead, such as multiple electrodes at different perimeter locations around outer perimeter 78 of lead 50 at each of the locations, such as by using electrode modules. As mentioned above, each electrode of the plurality of electrodes 60 may be electrically coupled to a respective electrical conductor of the plurality of electrical conductors 74. Each of the plurality of electrodes 60 may be formed from a biocompatible electrically conductive material including, but not limited to, platinum, palladium, iridium, and other biocompatible materials suitable for contact with bodily tissue. For example, electrodes may be formed from a 90/10 platinum/iridium alloy.

Referring to FIGS. 1-3, as discussed above, in some examples, it may be desirable for a clinician to be aware of the orientation and/or position of lead 50. For instance, it may be desirable for a clinician to be aware of the orientation and/or position of lead 50 when using programmer 30 to program IMD 20 to deliver electrical stimulation to patient 40 via electrodes 60 of lead 50.

In accordance with one or more techniques of this disclosure, system 10 may include lead detection system 102, which may be configured to determine an orientation and/or a location of lead 50 as implanted in patient 40. As shown in FIG. 1, lead detection system 102 may determine the orientation and/or the location of lead 50 based on image data captured by imaging device 100.

Imaging device 100 may represent any device capable of capturing images of a patient. Examples of imaging device 100 include, but are not necessarily limited to, x-ray imaging devices, computed tomography (CT) imaging devices, magnetic resonance imaging (MRI) devices, ultrasound imaging devices, and any other type of imaging device. In one specific example imaging device 100 includes the O-arm™ imaging system available from Medtronic Inc. In some examples, imaging device 100 may be capable of producing image data with a resolution at least (1.0 mm×1.0 mm×1.0 mm), (0.6 mm×0.6 mm×0.6 mm), (0.4 mm×0.4 mm×0.4 mm), . . . , (0.1 mm×0.1 mm×0.1 mm), or any other resolution suitable for imaging lead 50.

Imaging device 100 may provide image data corresponding to the captured image to other components of system 10, such as lead detection system 102. Imaging device 100 may provide the image data in any suitable format. Example formats include, but are not necessarily limited to, Analyze, Neuroimaging Informatics Technology Initiative (Nifti), Minc, and Digital Imaging and Communications in Medicine (DICOM).

Lead detection system 102 may represent a system configured to analyze image data to determine an orientation and/or a location of a lead implanted in a patient. In the example of FIG. 1, lead detection system 102 may analyze image data generated by imaging device 100 to determine an orientation and/or a location of lead 50 after lead 50 has been implanted in patient 40.

Lead 50 may include various features to facilitate lead detection system 102 in determining the orientation and/or the location. For instance, as shown in the example of FIG. 3, lead 50 may include orientation markers 82A and 82B (collectively, "orientation markers 82"). Orientation markers 82 may be located at specific positions within lead 50 relative to positions of electrodes 60 such that the rotational orientation of orientation markers 82 is a function of the rotational orientation of electrodes 60. Additionally, in some examples, orientation markers 82 may be positioned at a specific distance, or distances, along longitudinal axis 70 from one or more of electrodes 60. For instance, orientation markers 82 may be positioned at a specific distance along longitudinal axis 70 from the most distal electrode (i.e., electrode 62 in FIG. 3). Orientation markers 82 may also be disposed at respective different positions around the perimeter of lead 50.

In some examples, orientation markers 82 may be positioned at different positions along longitudinal axis 70. For instance, as shown in FIG. 3, orientation marker 82A may be positioned closer to a tip of distal end 54 than orientation marker 82B. As such, in some examples, orientation marker 82A may be referred to as an upper orientation marker and orientation marker 82B may be referred to as a bottom or lower orientation marker. As described below, positioning orientation markers 82 at different positions along longitudinal axis 70 enables lead detection system 102 to determine a specific rotational orientation of lead 50 (i.e., as opposed to determining two possible rotational orientations that are 180 degrees apart).

Orientation markers 82 may be formed from a material visible in images captured by imaging device 100. For instance, orientation markers 82 may be formed to include a radiopaque material such as at least one of barium sulfate, bismuth compounds, or tungsten. Orientation markers 82 may be formed in shapes to enable determination of the rotational orientation of lead 50. Example shapes include, but are not necessarily limited to, triangles, rectangles with windows, partial rings (e.g., a cross-section similar to a "C"), or the like.

Figures 4A, 4B:
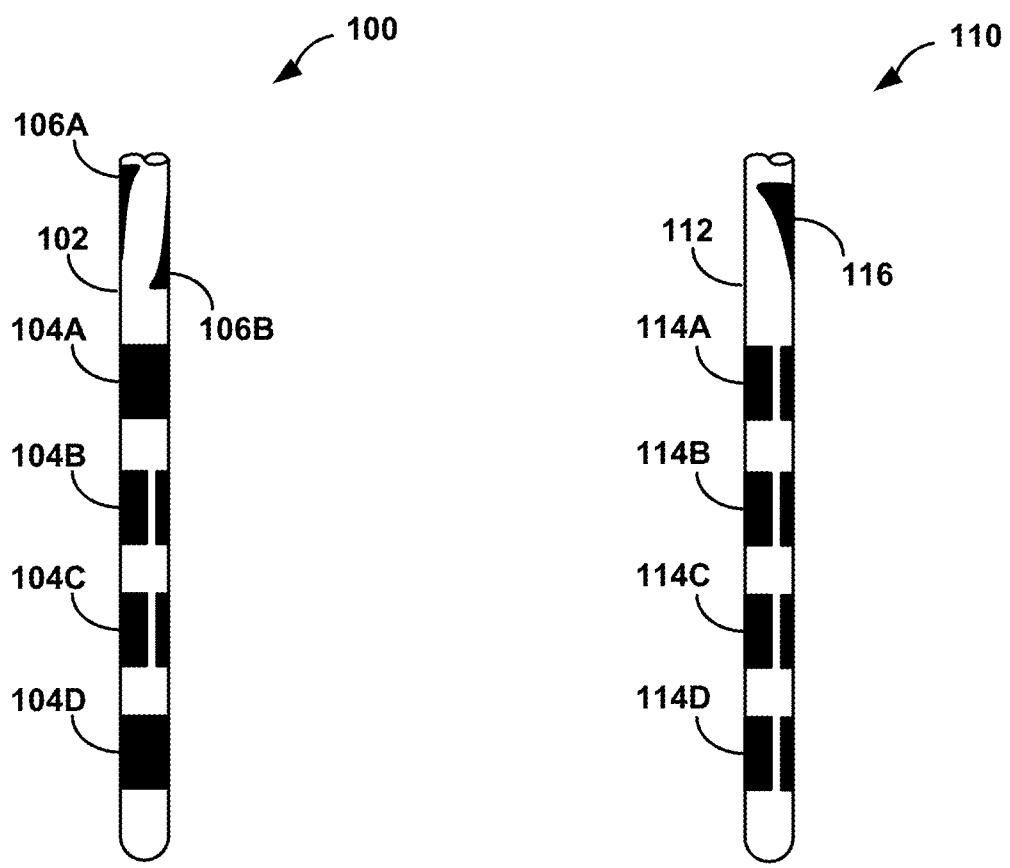
FIGS. 4A and 4B are conceptual diagrams of example leads with respective electrodes carried by the lead.

FIGS. 4A and 4B are conceptual diagrams of example leads 100 and 110, respectively, with respective electrodes carried by the lead. As shown in FIGS. 4A and 4B, leads 100 and 110 are examples of lead 50 shown in FIG. 1. As shown in FIG. 4A, lead 100 includes four electrode levels 104 (includes levels 104A-104D) mounted at various lengths of lead housing 102. Lead 100 is inserted into through cranium 48 to a target position within brain 49.

Lead 100 is implanted within brain 49 at a location determined by the clinician to be near an anatomical region to be stimulated. Electrode levels 104A, 104B, 104C, and 104D are equally spaced along the axial length of lead housing 102 at different axial positions. Each electrode level 104 may have one, two, three, or more electrodes located at different angular positions around the circumference (e.g., around the perimeter) of lead housing 102. As shown in FIG. 4A, electrode level 104A and 104D include a single respective ring electrode, and electrode levels 104B and 104C each include three electrodes at different circumferential positions. This electrode pattern may be referred to as a 1-3-3-1 lead in reference to the number of electrodes at respective longitudinal positions from the proximal end to the distal end of lead 100. Electrodes of one circumferential location may be lined up on an axis parallel to the longitudinal axis of lead 100. Alternatively, electrodes of different electrode levels may be staggered around the circumference of lead housing 102. In addition, lead 100 or 110 may include asymmetrical electrode locations around the circumference, or perimeter, of each lead or electrodes of the same level that have different sizes. These electrodes may include semicircular electrodes that may or may not be circumferentially aligned between electrode levels.

Lead housing 102 may include orientation markers 106A and 106B, which are examples of orientation markers 82. The orientation markers 106A and 106B correspond to a certain circumferential location that allows lead 100 to the imaged when implanted in patient 40. Using the images of patient 40, the clinician can use the orientation markers 106A and 106B as a marker for the exact orientation of lead 100 within the brain 49 of patient 40 as described herein. Orientation of lead 100 may be used to easily program the stimulation parameters by generating the correct electrode configuration to match the stimulation field defined by the clinician. In some examples, a marking mechanism other than orientation markers 106A and 106B may be used to identify the orientation of lead 100. These marking mechanisms may include something similar to a tab, detent, or other structure on the outside of lead housing 102 or embedded within lead housing 102. In some examples, the clinician may note the position of markings along a lead wire during implantation to determine the orientation of lead 100 within patient 40.

FIG. 4B illustrates lead 110 that includes multiple electrodes at different respective circumferential positions at each of levels 114A-114D. Similar to lead 100, lead 110 is inserted through a burr hole in cranium 48 to a target location within brain 49. Lead 110 includes lead housing 112. Four electrode levels 114 (114A-114D) are located at the distal end of lead 110. Each electrode level 114 is evenly spaced from the adjacent electrode level and includes two or more electrodes. In one example, each electrode level 114 includes three, four, or more electrodes distributed around the circumference of lead housing 112. Therefore, lead 110 includes 114 electrodes as an example. Each electrode may be substantially rectangular in shape. Alternatively, the individual electrodes may have alternative shapes, e.g., circular, oval, triangular, rounded rectangles, or the like. Lead 110 may include orientation marker 116 similar to one of orientation markers 106A and 106B, which may be an example of orientation markers 82. Lead 110 is an example of a lead that includes only one orientation marker.

In some examples, electrode levels 104 or 114 are not evenly spaced along the longitudinal axis of the respective leads 100 and 110. For example, electrode levels 104C and 104D may be spaced approximately 3 millimeters (mm) apart while electrodes 104A and 104B are 10 mm apart. Variable spaced electrode levels may be useful in reaching target anatomical regions deep within brain 49 while avoiding potentially undesirable anatomical regions. Further, the electrodes in adjacent levels need not be aligned in the direction as the longitudinal axis of the lead, and instead may be oriented diagonally with respect to the longitudinal axis.

Leads 100 and 110 are substantially rigid to prevent the implanted lead from varying from the expected lead shape. Leads 100 or 110 may be substantially cylindrical in shape. In some examples, leads 100 or 110 may be shaped differently than a cylinder. For example, the leads may include one or more curves to reach target anatomical regions of brain 49. In some examples, leads 100 or 110 may be similar to a flat paddle lead or a conformable lead shaped for patient 12. Also, in some examples, leads 100 and 110 may any of a variety of different polygonal cross sections (e.g., triangle, square, rectangle, octagonal, etc.) taken transverse to the longitudinal axis of the lead.

As shown in the example of lead 100, the plurality of electrodes of lead 100 includes a first set of three electrodes disposed at different respective positions around the longitudinal axis of the lead and at a first longitudinal position along the lead (e.g., electrode level 104B), a second set of three electrodes disposed at a second longitudinal position along the lead different than the first longitudinal position (e.g., electrode level 104C), and at least one ring electrode disposed at a third longitudinal position along the lead different than the first longitudinal position and the second longitudinal position (e.g., electrode level 104A and/or electrode level 104D). In some examples, electrode level 104D may be a bullet tip or cone shaped electrode that covers the distal end of lead 102.

Orientation markers 106A, 106B, or 116 are generally shown as triangular in shape with a curve that matches the curvature of the outside of the lead. However, shapes other than triangles are also contemplated. For example, shapes such as squares, rectangles, oblique angled shapes, or other shapes at any orientation with respect to the lead may enable portions of imaging data that can be employed to determine the orientation of the lead. In another example, an orientation marker may include a full circumferential portion and a partial circumferential portion such that the orientation is at least partially asymmetrical with respect to the cross-section of the lead. In some examples, multiple orientation markers may be disposed at different asymmetrical positions around the perimeter of the lead.

Figure 5A:
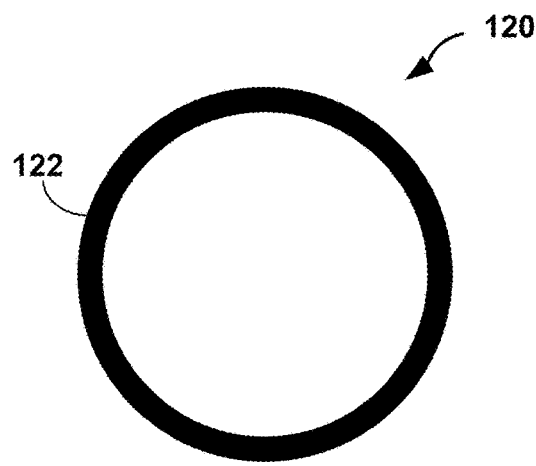
FIGS. 5A, 5B, 5C, and 5D are conceptual diagrams of example electrodes disposed around a perimeter of a lead at a particular longitudinal location.

FIGS. 5A-5D are transverse cross-sections of example stimulation leads having one or more electrodes around the circumference of the lead. As shown in FIGS. 5A-5D, one electrode level, such as one of electrode levels 104 and 114 of leads 100 and 110, are illustrated to show electrode placement around the perimeter, or around the longitudinal axis, of the lead. FIG. 5A shows electrode level 120 that includes circumferential electrode 122. Circumferential electrode 122 encircles the entire circumference of electrode level 120 and may be referred to as a ring electrode in some examples. Circumferential electrode 122 may be utilized as a cathode or anode as configured by the user interface.

Figure 5B:
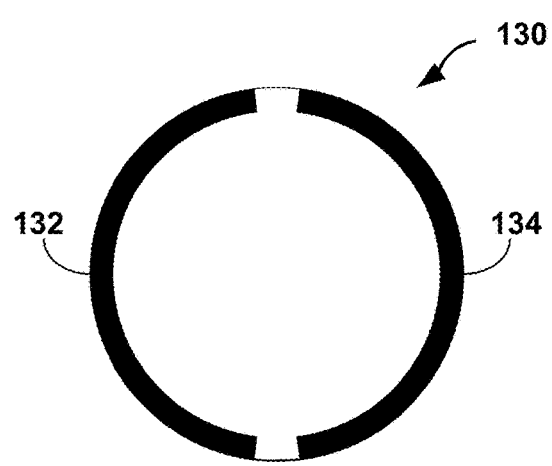

FIG. 5B shows electrode level 130 which includes two electrodes 132 and 134. Each electrode 132 and 134 wraps approximately 170 degrees around the circumference of electrode level 130. Spaces of approximately 10 degrees are located between electrodes 132 and 134 to prevent inadvertent coupling of electrical current between the electrodes. Smaller or larger spaces between electrodes (e.g., between 10 degrees and 30 degrees) may be provided in other examples. Each electrode 132 and 134 may be programmed to act as an anode or cathode.

Figure 5C:
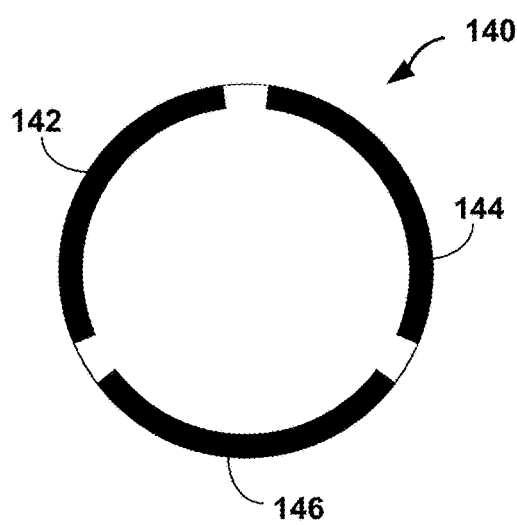

FIG. 5C shows electrode level 140 which includes three equally sized electrodes 142, 144 and 146. Each electrode 142, 144 and 146 encompass approximately 110 degrees of the circumference of electrode level 140. Similar to electrode level 130, spaces of approximately 10 degrees separate electrodes 142, 144 and 146. Smaller or larger spaces between electrodes (e.g., between 10 degrees and 30 degrees) may be provided in other examples. Electrodes 142, 144 and 146 may be independently programmed as an anode or cathode for stimulation.

Figure 5D:
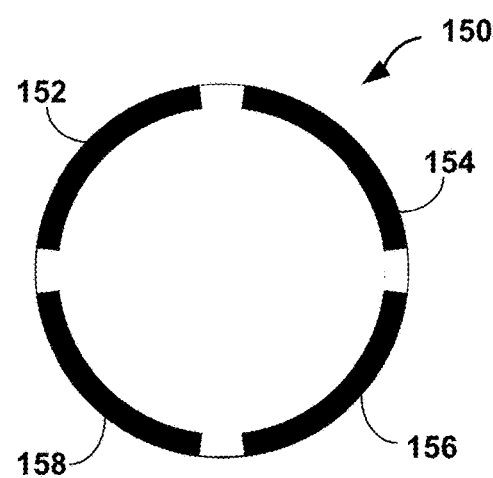

FIG. 5D shows electrode level 150 which includes four electrodes 152, 154, 156 and 158. Each electrode 152, 154, 156 and 158 covers approximately 80 degrees of the circumference with approximately 10 degrees of insulation space between adjacent electrodes. Smaller or larger spaces between electrodes (e.g., between 10 degrees and 30 degrees) may be provided in other examples. In some examples, up to ten or more electrodes may be included within an electrode level. In some examples, consecutive electrode levels of lead 114 may include a variety of electrode levels 120, 130, 140, and 150. For example, lead 114 (or any other lead described herein) may include electrode levels that alternate between electrode levels 130 and 150 depicted in FIGS. 5B and 5D. In this manner, various stimulation field shapes may be produced within brain 49 of patient 40. Further the above-described sizes of electrodes within an electrode level are merely examples, and the invention is not limited to the example electrode sizes.

Also, the insulation space, or non-electrode surface area, may be of any size. Generally, the insulation space is between approximately 1 degree and approximately 20 degrees. More specifically, the insulation space may be between approximately 5 and approximately 15 degrees. In other examples, insulation space may be between approximately 10 degrees and 30 degrees or larger. Smaller insulation spaces may allow a greater volume of tissue to be stimulated. In some examples, electrode size may be varied around the circumference of an electrode level. In addition, insulation spaces may vary in size as well. Such asymmetrical electrode levels may be used in leads implanted at tissues needing certain shaped stimulation fields.

Figure 6:
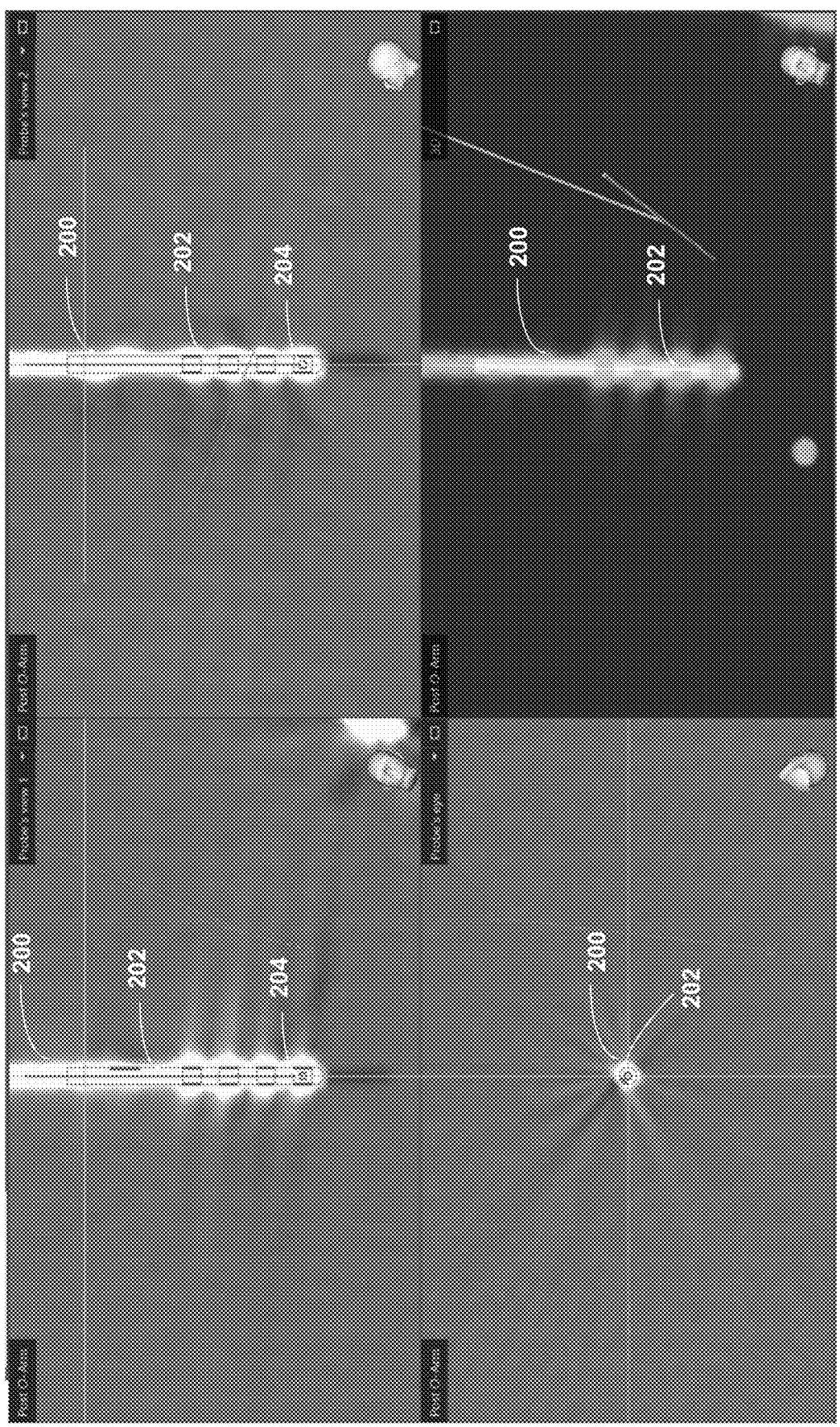
FIG. 6 is an example image generated by an imaging device of an implanted lead in a patient having a graphical lead representation, in accordance with one or more techniques of this disclosure.

FIG. 6 is an example image generated by an imaging device of an implanted lead in a patient having a graphical lead representation, in accordance with one or more techniques of this disclosure. For instance, FIG. 6 illustrates different perspectives of graphical representation 202 of lead 50 imposed over lead object 200 of lead 50 in the image content. For example, lead 50 appears as object 200 in the image content. It may be possible (e.g., by a user or by processing circuitry of lead detection system 102) to determine how lead 50 would fit within the lead object 200, and illustrate the fitting of lead 50 within lead object 200 with graphical representation 202.

In some examples, the user or the processing circuitry may select reference point 204. That is, the processing circuitry may determine a reference point in the image content (e.g., with user input or based on a best match of where a particular electrode is in object 200). As illustrated with respect to FIG. 7, the processing circuity may determine a plane in the image content that corresponds to an orientation marker (e.g., orientation markers 82, 106, or 116). For instance, the distance from reference point 204 and the orientation marker may be fixed, and therefore, by determining reference point 204, it may be possible to determine the axial plane on which the orientation marker is located. In one or more examples, the processing circuitry may also utilize the direction vector to orient the direction from reference point 204 towards the orientation marker such that the direction vector is along the longitudinal axis of lead 50 (e.g., centered or parallel to the longitudinal axis), and forms a straight line from reference point 204 to the orientation marker.

In some examples, to determine the plane, the processing circuitry may utilize reference point 204, and a direction vector that indicates the direction of object 200. For instance, assume that the distance between reference point 204 and the orientation marker is "D." In 3D space, there may be infinite number of points that are a distance D away from reference point 204. However, by utilizing a direction vector that indicates the direction of object 200, there may be only one point along the direction vector that is the distance D away from reference point 204, and can be used to determine the axial plane on which the orientation marker is located. The direction vector that indicates the direction of object 200 may be the same vector used to position lead 50 in the image content.

Figure 7:
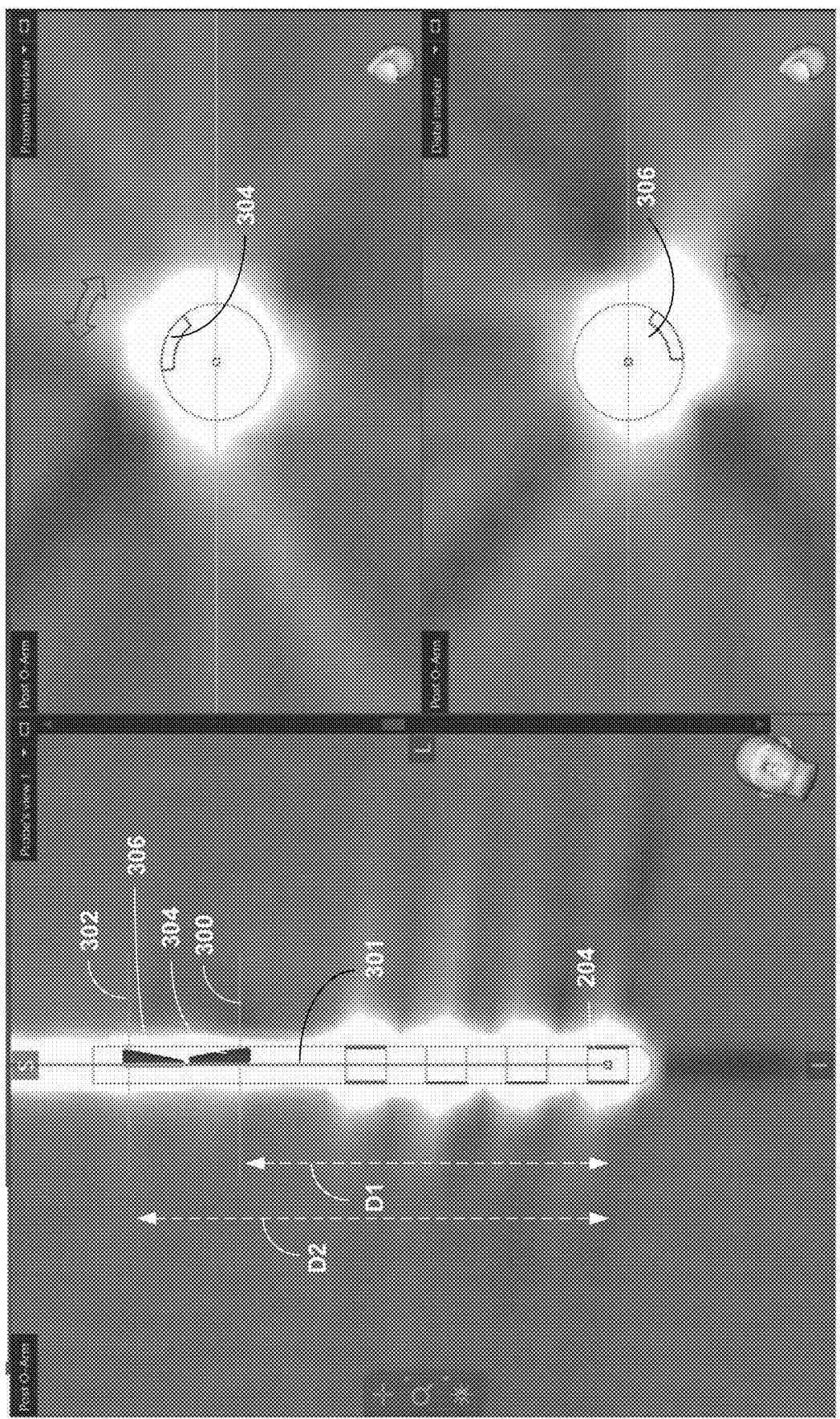
FIG. 7 illustrates example CT images of different axial slices of a lead for determining lead orientation.

FIG. 7 illustrates example CT images of different axial slices of a lead for determining lead orientation. For instance, FIG. 7 illustrates an example of plane 300 and plane 302 (e.g., planes orthogonal to the longitudinal axis of the lead), which are axial planes of the lead 50. The processing circuitry of lead detection system 102 may determine plane 300 based on distance D1 from reference point 204, and determine plane 302 based on distance D2 from reference point 204 (e.g., along the direction vector). For instance, for the lead type of lead 50, the distance between reference point 204 and plane 300 and plane 302 may be fixed, and therefore, the distance D1 and D2 may be fixed. The processing circuitry may retrieve the values of D1 and D2 to determine the location of plane 300 and plane 302.

In some examples, to determine the location of plane 300 and plane 302, the processing circuitry may utilize direction vector 301 that extends from reference point 204 along the image content of lead 50 (e.g., along object 200). For instance, there may be near infinite points that are a distance D1 or D2 from the reference point 204 in 3D space. However, there may be only one point along vector 301 that is a distance D1 or D2 from reference point 204. By utilizing direction vector 301, the processing circuitry may ensure that the determined plane intersects the image content of lead 50.

In one or more examples, direction vector 301 is centered along the longitudinal axis of lead 50, or may be parallel to the longitudinal axis of lead 50. Accordingly, direction vector 301 may form a straight line along the longitudinal axis of lead 50, and can be used to determine the longitudinal distance from reference point 204. For instance, distance D1 and D2 are longitudinal distances along the longitudinal axis of lead 50, and direction vector 301 may be along the longitudinal axis (e.g., centered or parallel to the longitudinal axis of lead 50). Distance D1 or D2 may be determined along direction vector 301 to indicate the longitudinal distance.

As shown in FIG. 7, plane 300 corresponds to a graphical representation of first orientation marker 304, and plane 302 corresponds to a graphical representation of second orientation marker 306. In the example of FIG. 7, the exact orientation of orientation markers 304, 306 may not be known, and therefore, may be displayed to a user for user adjustment.

In some examples, the processing circuitry may determine an initial plane, and display the initial plane to the user. The user may then adjust the initial plane. Accordingly, in some examples, to determine the plane in the image content, the processing circuitry may determine an initial plane, and receive user input to adjust the initial plane.

In some examples, to determine the plane, the processing circuitry may determine the plane based on the distance between reference point 204 and the location of orientation markers 304, 306 (e.g., based on direction vector 301). The processing circuitry may add or subtract an offset value to ensure that the plane truly intersects orientation markers 304, 306.

For example, FIG. 7, in the top-right portion, illustrates the axial plane 300 having graphical representation of orientation marker 304, and, in the bottom-right portion, illustrates the axial plane 302 having graphical representation of orientation marker 306. As can be seen in the top-right and bottom-right portions of FIG. 7, there are hyperintensive region(s) in which there is relatively higher concentration of hyperintensive voxel(s). Such hyperintensive region(s) are due to the orientation markers 304 and 306. In some examples, the user may adjust the graphical representation of orientation markers 304, 306 to align orientation markers 304, 306 to the hyperintensive region(s) having the higher concentration of hyperintensive voxel(s). In this way, the processing circuitry may determine the orientation of the lead.

That is, to determine the orientation of lead, the processing circuitry may be configured to output a display of the determined plane in the image content. For instance, the processing circuitry may display the top-right and bottom-right portions of FIG. 7. The processing circuitry may receive user input indicative of the orientation of the lead in response to outputting the display of the determined plane. For instance, the processing circuitry may receiver user input to move the graphical representations of orientation markers 304, 306 to align the graphical representations to the hyperintensive region(s) having higher concentration of hyperintensive voxel(s) caused by the orientation markers. The result may be orientation of lead 50.

Accordingly, FIGS. 6 and 7 illustrate example ways in which to determine the orientation of lead 50. In some examples, FIGS. 6 and 7 may be displayed to the user for user feedback to determine the orientation of lead 50. However, in some examples, where the processing circuitry is configured to autonomously determine the orientation of lead 50, FIGS. 6 and/or 7 may not be displayed to the user, or may be displayed but no response may be needed.

In one or more examples, where user response is used, the following workflow may be one example of the workflow that the system can follow to determine the orientation of the lead. (1) Identify the location of the lead by overlaying a CAD model of the lead onto the lead object in a postoperative CT or O-Arm Scan (e.g., as shown in FIG. 6). (2) Re-orient the image to the lead coordinate system (e.g., as shown in FIG. 6). (3) Show cross sections of the lead object through the two orientation markers, while also showing a vertical cross section of the lead (e.g., as shown in FIG. 7). The processing circuitry may determine the location of the orientation markers based on the vertical distance up the lead from the lead tip (e.g., reference point 204), as described above. In this way, the user may clearly see the effect of the orientation markers on the hyperintensive the cross sections. (4) Allow users to rotate the lead CAD model until it aligns to the hyperintensive region in the image (e.g., as shown in FIG. 7).

In some examples, for automatically determining the orientation of the lead, the processing circuitry may perform the following example operations. (1) Transform and resample image (e.g., the processing circuitry may perform a transformation and resampling of the image content so as to determine a rigid transform such that the lead is oriented along the z axis, using the input tip (e.g., location of the reference point, which may be an electrode) and trajectory (e.g., a direction vector line that extends from the reference point along where the image content of lead 50 is present).

(2) Select and apply threshold. For instance, the processing circuitry may adaptively select the lead threshold, such that the brightest (e.g., most luminance) voxels with a certain fixed volume, V_lead, will be selected as potential electrodes (e.g., V_lead=10.0 mm^3). In some examples, all the intensities of the image are sorted, and the threshold is selected as the N'th highest one, such that N=V_lead/One_Voxel_volume, where One_Voxel_Volume is the volume of a single voxel.

(3) Find centroid line and refine the trajectory. The processing circuitry may scan the image content of lead 50 along the z axis, and compute a centroid of each 2D slice. The processing circuitry may utilize robust linear regression to fit a line which refines the initial trajectory input.

(4) Find centroid of directional markers. The processing circuitry may be configured to search for orientation markers 82. For example, the processing circuitry may scan the image content of lead 50 along the z axis, and centroid of each 2D slice is computed. By using a CAD model, it is known that the centroids for orientation markers 82 should be in a position with a certain distance Dz along the z axis. The processing circuitry may find the best fit that maximizes norm(distance(centroid(z)-centroid(z+Dz)). Dz depends on the lead model of lead 50.

(5) Compute electrode orientation. The processing circuitry may determine direction vectors connecting the centroids of orientation markers 82, and project the direction vectors orthogonal to the lead trajectory. The direction vectors that encompass the relatively bright voxels may define the area (e.g., hyperintensive region) in the image content that includes hyperintensive voxels caused by orientation markers 82, and may define the orientation of orientation markers 82. In some examples, the processing circuitry may add a bias (e.g., of 30 degrees), but such adding of bias is not needed in all examples. The processing circuitry may then output the orientation of lead 50.

Figure 8:
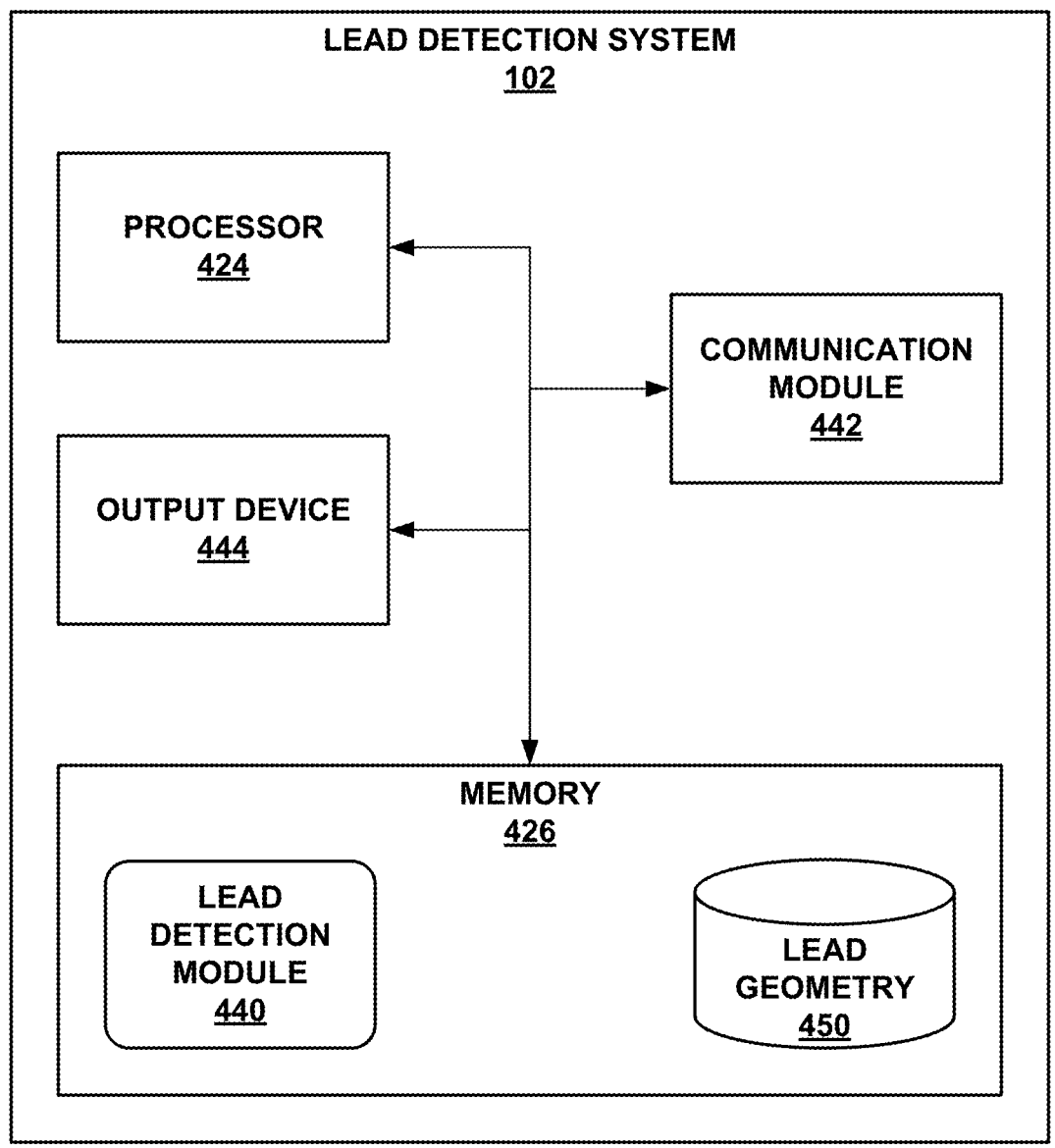
FIG. 8 is functional block diagram illustrating components of an example lead detection system.

FIG. 8 is functional block diagram illustrating components of an example lead detection system 102. Examples of lead detection system 102 include, but are not necessarily limited to, desktops, tablets, laptops, mainframes, cloud computing environments, servers, or any type of other computing system. As one specific example, lead detection system 102 may be the StealthStation™ S8, available from Medtronic Inc. In the example of FIG. 8, lead detection system 102 includes processor circuitry 424 (also referred to as "processor"), memory 426, and communication module 428. Each of these components (also referred to as "modules" may be or include electrical circuitry configured to perform the functions attributed to each respective module).

Processor 424 may include any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processor 424 herein may be embodied as firmware, hardware, software or any combination thereof.

Memory 426 may include any volatile or non-volatile media, such as a random-access memory (RAM), read only memory (ROM), non-volatile RAM (NVRAM), electrically erasable programmable ROM (EEPROM), flash memory, and the like. Memory 426 may store computer-readable instructions that, when executed by processor 424, cause lead detection system 102 to perform various functions. Memory 426 may be a storage device or other non-transitory medium. As shown in FIG. 8, memory 426 may store lead detection module 440 and lead geometry 450. Lead geometry 450 may also be referred to as lead parameters 450.

Lead geometry 450 may include various parameters about leads, such as lead 50. Examples of parameters that may be included in lead geometry 450 include, but are not limited to, such as models of leads (e.g., CAD models, template models, etc.), coordinates of centers of orientation markers and electrodes of the lead, distances between orientation markers and electrodes of the lead, angles between a direction vector connecting the orientation markers and centers of the electrodes, or any other parameters. In some examples, lead geometry 450 may include respective sets of lead geometry for different models of leads. For instance, lead geometry 450 may include a first set of lead geometry for a first lead model and a second set of lead geometry for a second lead model. Although not necessary to the lead orientation determination described herein, processor 424 may utilize one or more lead geometry to facilitate determination of which axial slices should correspond to orientation markers or electrodes, reduce possible locations of orientation markers or electrodes, or confirm the lead orientation as described herein.

Communication module 442 may communicate with external devices via one or more wired and/or wireless networks by transmitting and/or receiving network signals on the one or more networks. Examples of communication module 442 include a network interface card (e.g., such as an Ethernet card), an optical transceiver, a radio frequency transceiver, a GPS receiver, or any other type of device that can send and/or receive information. Other examples of communication units 442 may include short wave radios, cellular data radios, wireless network radios, as well as universal serial bus (USB) controllers.

In accordance with one or more techniques of this disclosure, lead detection module 440 may be executable by processor 424 to determine a location and/or orientation of a lead implanted in a patient based on image data representing the lead implanted in the patient (e.g., image data generated by an imaging device, such as imaging device 100 of FIG. 1) as described herein. The image data may represent a relatively small volume of interest containing the lead (e.g., the portion of the lead carrying the electrodes and the orientation markers). In some examples, lead detection module 440 may perform pre-processing on the image data. For instance, lead detection module 440 may use linear interpolation to resample the volume of interest to a fixed voxel resolution (e.g., 0.1 mm×0.1 mm×0.1 mm).

Lead detection module 440 may determine various parameters of the lead. As one example, lead detection system 440 may receive a representation of user input indicating a manufacturer and model of the lead. As another example, lead detection system 440 may receive a message from the IMD indicating a manufacturer and model of the lead (e.g., via a telemetry link). Based on the manufacturer and model, lead detection module 440 may query lead geometry 450 to determine the parameters of the lead. Lead detection module 440 may perform the various techniques described herein for determining lead orientation.

Regardless of the particular technique utilized, lead detection module 440 may generate an output that includes any combination of the following: location of electrodes with respect to patient anatomical direction and/or anatomical structures, the centroid of distal electrode (3D point) in voxel coordinates, the direction vector of lead trajectory (from distal electrode towards proximal electrode (3D vector)), the direction of the center of a target electrode segment (3D vector, perpendicular to the direction of the lead trajectory), a confidence score (e.g., a value representing the likelihood that the other outputs are accurate), or any other indication or representation of lead orientation and/or electrode position within patient 40.

Lead detection module 440 may provide the output via any channel. As one example, lead detection module 440 may cause an output device to display a graphical representation of the lead overlaid on an image of the patient in which the lead is implanted. The graphical representation may show the orientation and/or location of the lead relative to the patient (e.g., relative to one or more anatomical structures of the patient). As another example, lead detection module 440 may cause an output device to display numerical representations of any combination of the outputs described above.

Figure 9:
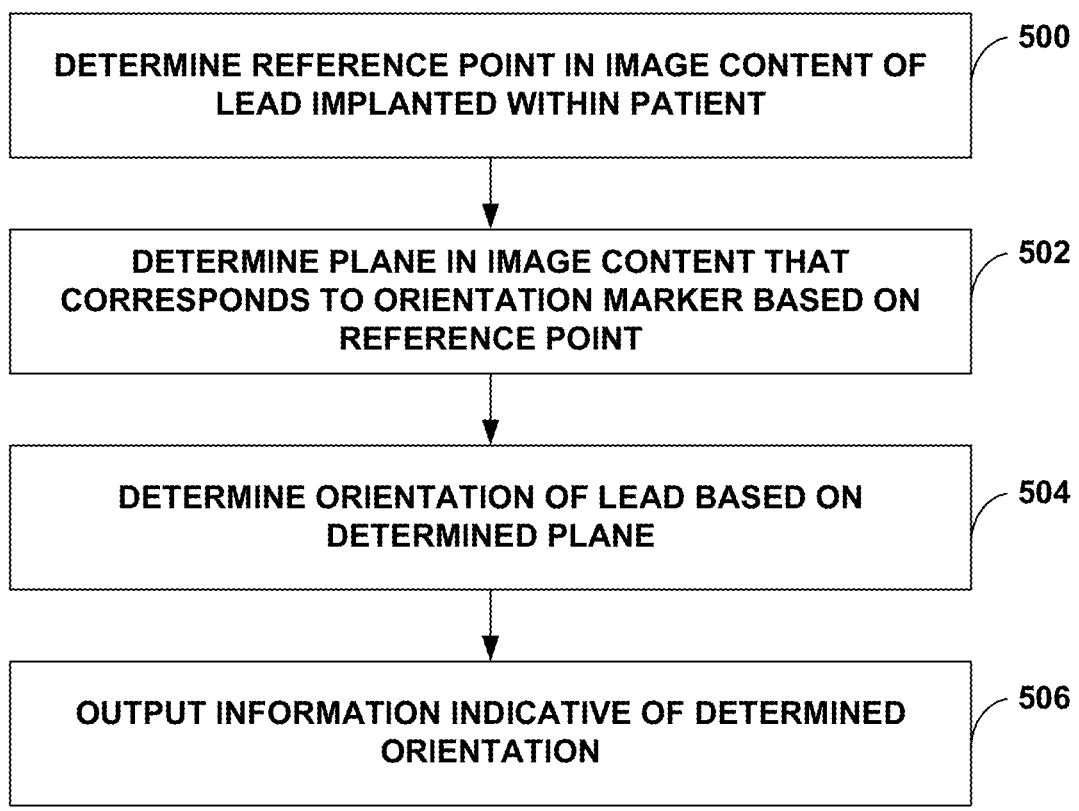
FIG. 9 is a flowchart illustrating an example method of operation, in accordance with one or more techniques of this disclosure.

FIG. 9 is a flowchart illustrating an example method of operation, in accordance with one or more techniques of this disclosure. The example techniques may be performed by a system, such as lead detection system 102. For instance, memory 426 of lead detection system 102 may store image content of lead 50 implanted within patient 40. Processor 424 (e.g., processing circuitry) may be configured to perform the example techniques.

As one example, processor 424 may be configured to determine a reference point in the image content (500). One example of the reference point is reference point 204 in FIG. 6. In some examples, to determine the reference point, processor 424 may be configured to receive information indicative of the reference point (e.g., the user may provide reference point 204). In some examples, to determine the reference point, processor 424 may be configured to determine an area (e.g., hyperintensive region) in the image content having relatively high luminance, determine that the area (e.g., hyperintensive region) corresponds to an electrode on the lead, and determine the reference point within the area (e.g., hyperintensive region) that corresponds to the electrode.

Processor 424 may determine a plane in the image content that corresponds to an orientation marker based on the reference point (502). Examples of the planes include planes 300 and 302 in FIG. 7. To determine the plane in the image content, processor 424 may be configured to retrieve information indicative of a distance between the reference point and the orientation marker (e.g., from lead geometry 450 stored in memory 426), determine an axial location of the orientation marker based on the distance between the reference point and the orientation marker (e.g., determine the axial location based on distances D1 and/or D2), and determine the plane in the image content based on the determined axial location of the orientation marker.

Processor 424 may be configured to determine an orientation of the lead based on the determined plane (504). For example, to determine the orientation of the lead, processor 424 may be configured to output a display of the determined plane in the image content, and receive user input indicative of the orientation of the lead in response to outputting the display of the determined plane (e.g., as shown in FIG. 7). As another example, to determine the orientation of the lead, processor 424 may be configured to determine an area (e.g., hyperintensive region) in the plane having relatively high luminance, determine that the area (e.g., hyperintensive region) in the plane corresponds to an orientation of the orientation marker, and determine the orientation of the lead based on the orientation of the orientation marker.

Processor 424 may output information indicative of the determined orientation (506). The clinician may then use the information indicative of the determined orientation to select therapy parameters such as amplitude, frequency, and pulse width.

Figure 10:
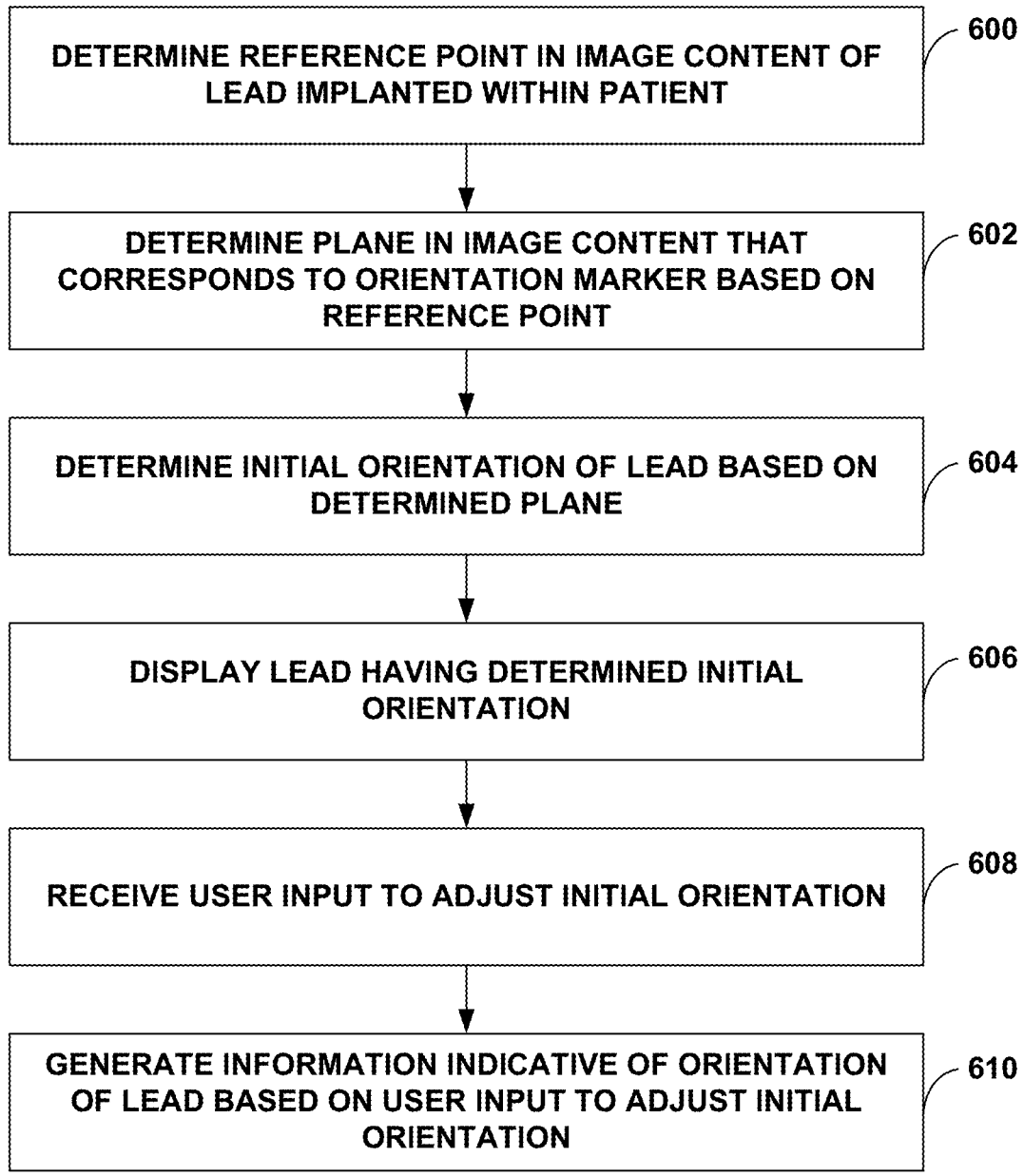
FIG. 10 is a flowchart illustrating an example method of operation, in accordance with one or more techniques of this disclosure.

FIG. 10 is a flowchart illustrating an example method of operation, in accordance with one or more techniques of this disclosure. The example techniques may be performed by a system, such as lead detection system 102. For instance, memory 426 of lead detection system 102 may store image content of lead 50 implanted within patient 40. Processor 424 (e.g., processing circuitry) may be configured to perform the example techniques.

Similar to FIG. 9, in FIG. 10, processor 424 may be configured to determine a reference point in the image content (600). One example of the reference point is reference point 204 in FIG. 6. In some examples, to determine the reference point, processor 424 may be configured to receive information indicative of the reference point (e.g., the user may provide reference point 204). In some examples, to determine the reference point, processor 424 may be configured to determine an area (e.g., hyperintensive region) in the image content having relatively high luminance, determine that the area (e.g., hyperintensive region) corresponds to an electrode on the lead, and determine the reference point within the area (e.g., hyperintensive region) that corresponds to the electrode.

Processor 424 may determine a plane in the image content that corresponds to an orientation marker based on the reference point (602). Examples of the planes include planes 300 and 302 in FIG. 7. To determine the plane in the image content, processor 424 may be configured to retrieve information indicative of a distance between the reference point and the orientation marker (e.g., from lead geometry 450 stored in memory 426), determine an axial location of the orientation marker based on the distance between the reference point and the orientation marker (e.g., determine the axial location based on distances D1 and/or D2), and determine the plane in the image content based on the determined axial location of the orientation marker.

Processor 424 may be configured to determine an initial orientation of lead 50 based on the determined plane (604). For example, processor 424 may determine an initial orientation of lead 50 based on autonomous processing, and may then be configured to determine the orientation of lead 50 based on user input. For instance, processor 424 may determine a reference point in the image content, determine a plane in the image content that corresponds to an orientation marker based on the reference point, and determine an initial orientation of the lead based on the determined plane.

Processor 424 may and display lead 50 having the determined initial orientation. (606). For instance, processor 424 may display the top-right and bottom-right portions of FIG. 7.

Processor 424 may then receive user input to adjust the initial orientation (608). For example, as described above, in some examples, the user may adjust the graphical representation of orientation markers 304, 306 to align orientation markers 304, 306 to the hyperintensive region(s) having the higher concentration of hyperintensive voxel(s). Processor 424 may receive user input indicative of the orientation of the lead in response to outputting the display of the determined plane. For instance, processor 424 may receiver user input to move the graphical representations of orientation markers 304, 306 to align the graphical representations to the hyperintensive region(s) having higher concentration of hyperintensive voxel(s) caused by the orientation markers. The result may be orientation of lead 50.

Processor 424 may generate information indicative of an orientation of the lead based on the user input to adjust the initial orientation (610). For example, lead detection module 440 may generate an output that includes any combination of the following: location of electrodes with respect to patient anatomical direction and/or anatomical structures, the centroid of distal electrode (3D point) in voxel coordinates, the direction vector of lead trajectory (from distal electrode towards proximal electrode (3D vector)), the direction of the center of a target electrode segment (3D vector, perpendicular to the direction of the lead trajectory), a confidence score (e.g., a value representing the likelihood that the other outputs are accurate), or any other indication or representation of lead orientation and/or electrode position within patient 40.

Lead detection module 440 may provide the output via any channel. As one example, lead detection module 440 may cause an output device to display a graphical representation of the lead overlaid on an image of the patient in which the lead is implanted. The graphical representation may show the orientation and/or location of the lead relative to the patient (e.g., relative to one or more anatomical structures of the patient). As another example, lead detection module 440 may cause an output device to display numerical representations of any combination of the outputs described above.

The following examples are example systems, devices, and methods described herein.

Example 1. A system comprising: memory configured to store image content representative of a lead implanted within a patient; and processing circuitry configured to: determine a reference point in the image content; determine a plane in the image content that corresponds to an orientation marker based on the reference point; determine an orientation of the lead based on the determined plane; and output information indicative of the determined orientation.

Example 2. The system of example 1, wherein to determine the plane in the image content, the processing circuitry is configured to: retrieve information indicative of a distance between the reference point and the orientation marker; determine an axial location of the orientation marker based on the distance between the reference point and the orientation marker; and determine the plane in the image content based on the determined axial location of the orientation marker.

Example 3. The system of any of examples 1 and 2, wherein to determine the reference point, the processing circuitry is configured to receive information indicative of the reference point.

Example 4. The system of any of examples 1 and 2, wherein to determine the reference point, the processing circuitry is configured to: determine an area in the image content having relatively high luminance; determine that the area corresponds to an electrode on the lead; and determine the reference point within the area that corresponds to the electrode.

Example 5. The system of any of examples 1-4, wherein to determine the orientation of the lead, the processing circuitry is configured to: output a display of the determined plane in the image content; and receive user input indicative of the orientation of the lead in response to outputting the display of the determined plane.

Example 6. The system of any of examples 1-4, wherein to determine the orientation of the lead, the processing circuitry is configured to: determine an area in the plane having relatively high luminance; determine that the area in the plane corresponds to an orientation of the orientation marker; and determine the orientation of the lead based on the orientation of the orientation marker.

Example 7. The system of any of examples 1-6, wherein the orientation marker comprises a first orientation marker, wherein the plane comprises a first plane, wherein the processing circuitry is configured to determine a second plane in the image content that corresponds to a second orientation marker based on the reference point, and wherein to determine the orientation of the lead, the processing circuitry is configured to determine the orientation of the lead based on the first plane and the second plane.

Example 8. The system of any of examples 1-7, wherein the processing circuitry is configured to determine a direction vector based on the reference point and image content representative of the lead, wherein to determine the plane, the processing circuitry is configured to determine the plane based on the direction vector.

Example 9. A system comprising: memory configured to store image content representative of a lead implanted within a patient; and processing circuitry configured to: determine a reference point in the image content; determine a plane in the image content that corresponds to an orientation marker based on the reference point; determine an initial orientation of the lead based on the determined plane; display the lead having the determined initial orientation; receive user input to adjust the initial orientation; and generate information indicative of an orientation of the lead based on the user input to adjust the initial orientation.

Example 10. The system of example 9, wherein the processing circuitry is configured to perform the features of any one or combination of examples 2,4, and 6-8.

Example 11. A method comprising: determining a reference point in image content representative of a lead implanted within a patient; determining a plane in the image content that corresponds to an orientation marker based on the reference point; determining an orientation of the lead based on the determined plane; and outputting information indicative of the determined orientation.

Example 12. The method of example 11, wherein determining the plane in the image content comprises: retrieving information indicative of a distance between the reference point and the orientation marker; determining an axial location of the orientation marker based on the distance between the reference point and the orientation marker; and determining the plane in the image content based on the determined axial location of the orientation marker.

Example 13. The method of any of examples 11 and 12, wherein determining the reference point comprises receiving information indicative of the reference point.

Example 14. The method of any of examples 11 and 12, wherein determining the reference point comprises: determining an area in the image content having relatively high luminance; determining that the area corresponds to an electrode on the lead; and determining the reference point within the area that corresponds to the electrode.

Example 15. The method of any of examples 11-14, wherein determining the orientation of the lead comprises: outputting a display of the determined plane in the image content; and receiving user input indicative of the orientation of the lead in response to outputting the display of the determined plane.

Example 16. The method of any of examples 11-14, wherein determining the orientation of the lead comprises: determining an area in the plane having relatively high luminance; determining that the area in the plane corresponds to an orientation of the orientation marker; and determining the orientation of the lead based on the orientation of the orientation marker.

Example 17. The method of any of examples 11-16, wherein the orientation marker comprises a first orientation marker, wherein the plane comprises a first plane, the method further comprising determining a second plane in the image content that corresponds to a second orientation marker based on the reference point, and wherein determining the orientation of the lead comprises determining the orientation of the lead based on the first plane and the second plane.

Example 18. The method of any of examples 11-17, further comprising determining a direction vector based on the reference point and image content representative of the lead, wherein determining the plane comprises determining the plane based on the direction vector.

Example 19. A method comprising: determining a reference point in image content representative of a lead implanted within a patient; determining a plane in the image content that corresponds to an orientation marker based on the reference point; determining an initial orientation of the lead based on the determined plane; displaying the lead having the determined initial orientation; receiving user input to adjust the initial orientation; and generating information indicative of an orientation of the lead based on the user input to adjust the initial orientation.

Example 20. The method of example 17, further comprising performing the features of any one or combination of examples 12,14, and 16-18.

Example 21. A computer-readable storage medium storing instructions thereon that when executed cause one or more processors to perform the method of any one or combination of examples 11-20.

Example 22. A system comprising means for performing the method of any one or combination of examples 11-20.

For aspects implemented in software, at least some of the functionality ascribed to the systems and devices described in this disclosure may be embodied as instructions on a computer-readable storage medium such as RAM, DRAM, SRAM, FRAM, magnetic discs, optical discs, flash memory, or forms of EPROM or EEPROM. The instructions may be executed to support one or more aspects of the functionality described in this disclosure.

In addition, in some aspects, the functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components. Also, the techniques could be fully implemented in one or more circuits or logic elements. The techniques of this disclosure may be implemented in a wide variety of devices or apparatuses, including an IMB, an external programmer, a combination of an IMB and external programmer, an integrated circuit (IC) or a set of ICs, and/or discrete electrical circuitry, residing in an IMD and/or external programmer.

What is claimed is:

1. A system comprising:
   memory configured to store image content representative of a lead implanted within a patient; and
   processing circuitry configured to:
      determine a reference point in the image content;
      determine a plane in the image content that corresponds to an orientation marker on the lead based on the reference point, wherein to determine the plane in the image content, the processing circuitry is configured to:
         retrieve information indicative of a distance between the reference point and the orientation marker;
         determine an axial location of the orientation marker based on the distance between the reference point and the orientation marker; and
         determine the plane in the image content based on the determined axial location of the orientation marker;
      determine an orientation of the lead based on the determined plane; and
      output information indicative of the determined orientation.

2. The system of claim 1, wherein the processing circuitry is configured to determine a direction vector based on the reference point and image content representative of the lead, wherein to determine the plane, the processing circuitry is configured to determine the plane based on the direction vector.

3. The system of claim 1, wherein to determine the reference point, the processing circuitry is configured to receive information indicative of the reference point.

4. The system of claim 1, wherein to determine the reference point, the processing circuitry is configured to:
   determine an area in the image content having relatively high luminance;
   determine that the area corresponds to an electrode on the lead; and
   determine the reference point within the area that corresponds to the electrode.

5. The system of claim 1, wherein to determine the orientation of the lead, the processing circuitry is configured to:
   output a display of the determined plane in the image content; and
   receive user input indicative of the orientation of the lead in response to outputting the display of the determined plane.

6. The system of claim 1, wherein to determine the orientation of the lead, the processing circuitry is configured to:
   determine an area in the plane having relatively high luminance;
   determine that the area in the plane corresponds to an orientation of the orientation marker; and
   determine the orientation of the lead based on the orientation of the orientation marker.

7. The system of claim 1, wherein the orientation marker comprises a first orientation marker, wherein the plane comprises a first plane, wherein the processing circuitry is configured to determine a second plane in the image content that corresponds to a second orientation marker based on the reference point, and wherein to determine the orientation of the lead, the processing circuitry is configured to determine the orientation of the lead based on the first plane and the second plane.

8. A method comprising:
   determining a reference point in image content representative of a lead implanted within a patient;
   determining a plane in the image content that corresponds to an orientation marker on the lead based on the reference point, wherein determining the plane in the image content comprises:
      retrieving information indicative of a distance between the reference point and the orientation marker;
      determining an axial location of the orientation marker based on the distance between the reference point and the orientation marker; and
      determining the plane in the image content based on the determined axial location of the orientation marker;
   determining an orientation of the lead based on the determined plane; and
   outputting information indicative of the determined orientation.

9. The method of claim 8, wherein the orientation marker comprises a first orientation marker, wherein the plane comprises a first plane, the method further comprising determining a second plane in the image content that corresponds to a second orientation marker based on the reference point, and wherein determining the orientation of the lead comprises determining the orientation of the lead based on the first plane and the second plane.

10. The method of claim 8, further comprising determining a direction vector based on the reference point and image content representative of the lead, wherein determining the plane comprises determining the plane based on the direction vector.

11. The method of claim 8, wherein determining the reference point comprises receiving information indicative of the reference point.

12. The method of claim 8, wherein determining the reference point comprises:
   determining an area in the image content having relatively high luminance;
   determining that the area corresponds to an electrode on the lead; and
   determining the reference point within the area that corresponds to the electrode.

13. The method of claim 8, wherein determining the orientation of the lead comprises:
   outputting a display of the determined plane in the image content; and
   receiving user input indicative of the orientation of the lead in response to outputting the display of the determined plane.

14. The method of claim 8, wherein determining the orientation of the lead comprises:
   determining an area in the plane having relatively high luminance;
   determining that the area in the plane corresponds to an orientation of the orientation marker; and
   determining the orientation of the lead based on the orientation of the orientation marker.

15. A non-transitory computer-readable storage medium storing instructions thereon that when executed cause one or more processors to:
   determine a reference point in image content representative of a lead implanted within a patient;
   determine a plane in the image content that corresponds to an orientation marker on the lead based on the reference point, wherein the instructions that cause the one or more processors to determine the plane in the image content comprise instructions that cause the one or more processors to:

retrieve information indicative of a distance between the reference point and the orientation marker;

determine an axial location of the orientation marker based on the distance between the reference point and the orientation marker; and determine the plane in the image content based on the determined axial location of the orientation marker;

determine an orientation of the lead based on the determined plane; and output information indicative of the determined orientation.

16. The non-transitory computer-readable storage medium of claim 15, wherein the instructions that cause the one or more processors to determine the orientation of the lead comprise instructions that cause the one or more processors to:

output a display of the determined plane in the image content; and receive user input indicative of the orientation of the lead in response to outputting the display of the determined plane.

17. The non-transitory computer-readable storage medium of claim 16, wherein the instructions that cause the one or more processors to determine the orientation of the lead comprise instructions that cause the one or more processors to:

determine an area in the plane having relatively high luminance;

determine that the area in the plane corresponds to an orientation of the orientation marker; and determine the orientation of the lead based on the orientation of the orientation marker.

* * * * *